(12) United States Patent
Uchiumi et al.

(10) Patent No.: US 10,012,789 B2
(45) Date of Patent: Jul. 3, 2018

(54) LAMINATE FILM, BACKLIGHT UNIT, AND LIQUID CRYSTAL DISPLAY DEVICE

(71) Applicant: FUJIFILM Corporation, Tokyo (JP)

(72) Inventors: Kyohisa Uchiumi, Kanagawa (JP); Eijiro Iwase, Kanagawa (JP)

(73) Assignee: FUJIFILM CORPORATION, Tokyo (JP)

( * ) Notice: Subject to any disclaimer, the term of this patent is extended or adjusted under 35 U.S.C. 154(b) by 301 days.

(21) Appl. No.: 14/869,244

(22) Filed: Sep. 29, 2015

(65) Prior Publication Data

US 2016/0091650 A1    Mar. 31, 2016

(30) Foreign Application Priority Data

Sep. 30, 2014    (JP) .................... 2014-200067

(51) Int. Cl.
*F21V 8/00*    (2006.01)
(52) U.S. Cl.
CPC ........... *G02B 6/0065* (2013.01); *G02B 6/005* (2013.01)
(58) Field of Classification Search
None
See application file for complete search history.

(56) References Cited

U.S. PATENT DOCUMENTS

| | | | |
|---|---|---|---|
| 2006/0062995 A1* | 3/2006 | Yamamoto ............. | B32B 27/08 428/332 |
| 2009/0202747 A1 | 8/2009 | Yukinobu et al. | |
| 2012/0113672 A1 | 5/2012 | Dubrow et al. | |
| 2015/0064401 A1* | 3/2015 | Honda ................ | H01L 51/5246 428/141 |
| 2015/0079405 A1* | 3/2015 | Nangou .................. | C08K 3/08 428/422.8 |
| 2016/0032160 A1* | 2/2016 | Koh ......................... | B32B 7/12 428/1.52 |
| 2016/0195229 A1* | 7/2016 | Tokinoya ................ | B32B 27/36 362/612 |
| 2017/0207415 A1* | 7/2017 | Ii .......................... | H01L 51/5253 |

FOREIGN PATENT DOCUMENTS

| | | |
|---|---|---|
| JP | 2009-028946 A | 2/2009 |
| JP | 2009-302029 A | 12/2009 |
| JP | 2013-544018 A | 12/2013 |

OTHER PUBLICATIONS

Toppan Printing Co Ltd, "Optical Material-Protecting Laminate, and Electroluminescence Optical Element and Electrophoretic Display Panel Using the Same," Feb. 12, 2009, Machine Translation of JP 2009-028946 A from JPO AIPN website, All pages.*
Notification of Reasons for Refusal issued by the Japanese Patent Office dated Oct. 27, 2016 in connection with Japanese Patent Application No. 2014-200067.

* cited by examiner

*Primary Examiner* — Dennis Y Kim
(74) *Attorney, Agent, or Firm* — Edwards Neils LLC; Jean C. Edwards

(57) ABSTRACT

A laminate film includes a gas barrier film having a barrier layer and a support which supports the barrier layer stacked on one surface of an optical functional layer, in which the gas barrier film and the optical functional layer satisfy the following adhesion force conditions: an adhesion force between the support and the barrier layer is smaller than an adhesion force between the optical functional layer and the barrier layer, and an adhesion force between the support and the barrier layer is an adhesion force enabling peeling.

5 Claims, 7 Drawing Sheets

FIG.7

| TEST | ADHESION FORCE | | PEELING ON PASS ROLLER | BREAKING OF ORGANIC LAYER | PEELING OF INORGANIC LAYER / OPTICAL FUNCTIONAL LAYER |
|---|---|---|---|---|---|
| | SUPPORT / ORGANIC LAYER | INORGANIC / OPTICAL LAYER | | | |
| 1 | 0.1N | 2.5N | C | A | A |
| 2 | 0.2N | 2.5N | B | A | A |
| 3 | 1.0N | 2.5N | A | B | A |
| 4 | 1.5N | 2.5N | A | C | A |
| 5 | 0.5N | 0.7N | A | A | C |
| 6 | 0.5N | 0.9N | A | A | B |
| 7 | 0.5N | 1.6N | A | A | A |
| 8 | 0.8N | 1.0N | A | A | C |
| 9 | 0.8N | 1.2N | A | A | B |
| 10 | 0.8N | 2.5N | A | A | A |

LAMINATE FILM, BACKLIGHT UNIT, AND LIQUID CRYSTAL DISPLAY DEVICE

CROSS-REFERENCE TO RELATED APPLICATIONS

This patent application claims priority under 35 U.S.C. § 119 to Japanese Patent Application No. 2014-200067 filed on Sep. 30, 2014. The above application is hereby expressly incorporated by reference, in its entirety, into the present application.

BACKGROUND OF THE INVENTION

Field of the Invention

The present invention relates to a laminate film, a backlight unit, a liquid crystal display device, and a method for producing a laminate film.

Description of the Related Art

Applications of a flat panel display such as a liquid crystal display device (LCD: liquid crystal display) (hereinafter, also referred to as "LCD") as a low power consumption and space-saving image display device are widespread year by year. The liquid crystal display device is configured from at least a backlight and a liquid crystal cell, and usually further includes members such as a polarization plate facing the backlight and a polarization plate facing a viewer.

In the flat panel display market, enhancement in color reproducibility progresses as an improvement in LCD performance. With respect to this point, a quantum dot (also referred to as Quantum Dot, QD particle or quantum point.) has attracted attentions as a luminescence material in recent year. For example, when excitation light is incident from a backlight to a light conversion member including the quantum dot, the quantum dot is excited to emit fluorescent light. Quantum dots each having a different luminescence property can be here used to thereby emit light having a narrow half-value width, of red light, green light and blue light, realizing white light. Since fluorescent light by the quantum dots has a narrow half-value width, wavelengths can be properly selected to thereby allow the resulting white light to be designed so that the white light is high in luminance and excellent in color reproducibility. Such a technique of providing a three-wavelength light source using the quantum dots advances to thereby expand the color reproduction region from 72%, a current ratio according to TV (television) standard (FHD, NTSC (National Television System Committee)), to 100%.

The QD particle, however, is caused to have a reduced quantum yield due to oxygen and/or steam, and therefore is required to be used with being protected by a barrier film.

Japanese Publication of International Patent Application No. 2013-544018 has proposed a laminate film obtained by sandwiching a quantum dot-containing layer between gas barrier films high in oxygen barrier property on its opposite sides and steam barrier property for the purpose of protection of quantum dots from oxygen and the like, for stacking them.

The method of sandwiching the quantum dot-containing layer between the gas barrier films includes coating the quantum dot-containing layer with one of the gas barrier films and curing the resultant to prepare a film, and attaching the film to the other of the gas barrier films with a pressure-sensitive adhesive or the like interposed.

SUMMARY OF THE INVENTION

The quantum dot-containing layer, however, is sandwiched between the gas barrier films on its opposite sides, and therefore a problem is that the thickness of a laminate film is increased and the film is not suitable for, in particular, a liquid crystal display device for a mobile application in which a thin thickness is demanded. As a solution to this problem, it is considered that the thicknesses of the gas barrier films are reduced as much as possible.

The structures of the gas barrier films and the quantum dot-containing layer, however, cause another problem that wrinkles are easily generated on a thin gas barrier film. In order to reduce the thicknesses of the gas barrier films without generating wrinkles, the limitation of the total thickness of the laminate film is considered to be 100 μm (50 μm (two 25-nm gas barrier films) and 50 μm (quantum dot-containing layer)).

Even a total thickness of the laminate film of 100 μm, however, cannot be said to be sufficient for, in particular, the liquid crystal display device for a mobile application in which a thin thickness is demanded, and a further reduction in thickness is demanded.

The problem about the thickness of the laminate film is common to not only a laminate film in which an optical functional layer is a quantum dot-containing layer, but also a laminate film in which a gas barrier film is stacked on an optical functional layer other than a quantum dot-containing layer.

The present invention has been made in view of such circumstances, and an object thereof is to provide a laminate film which is suitable for, in particular, a liquid crystal display device for a mobile application because of enabling to inhibit an optical functional layer from being degraded due to ingress of oxygen and/or steam to the optical functional layer and to reduce the thickness of a backlight in use inside the backlight, a backlight unit, a liquid crystal display device and a method for producing the laminate film.

In order to achieve the above object, the present invention provides a laminate film including a gas barrier film having a barrier layer and a support which supports the barrier layer stacked on one surface of both surfaces of an optical functional layer, in which the gas barrier film and the optical functional layer satisfy the following adhesion force conditions: an adhesion force between the support and the barrier layer is smaller than an adhesion force between the optical functional layer and the barrier layer, and the adhesion force between the support and the barrier layer is an adhesion force enabling peeling.

According to the laminate film of the present invention, the gas barrier film is stacked on one surface of the optical functional layer, and therefore the optical functional layer can be inhibited from being degraded due to ingress of oxygen and/or steam to the optical functional layer. Moreover, in the present invention, the gas barrier film and the optical functional layer satisfy the following adhesion force conditions: an adhesion force between the support and the barrier layer is smaller than an adhesion force between the optical functional layer and the barrier layer, and the adhesion force between the support and the barrier layer is an adhesion force enabling peeling; and therefore the laminate film, from which the support has been peeled, can be used inside a backlight unit. The thickness of the backlight unit can be thus reduced by the thickness corresponding to the thickness of the support peeled, and therefore it is possible to provide a laminate film suitable for, in particular, a liquid crystal display device for a mobile application in which a thin thickness is demanded.

It is desirable that the adhesion force between the support and the barrier layer be smaller than the adhesion force between the optical functional layer and the barrier layer by 0.4 N or more. If such a difference in the adhesion force is less than 0.4 N, the optical functional layer and the barrier layer not intended to be peeled may be peeled from each other.

In the laminate film of the present invention, it is preferable that a gas barrier film be stacked also on the other surface of the optical functional layer, and the gas barrier film on the other surface and the optical functional layer satisfy the same adhesion force conditions as the conditions for the gas barrier film on one surface.

Thus, the support can be peeled from each of both the two gas barrier films stacked on both surfaces of the optical functional layer, and the thickness of the laminate film can be reduced by the thicknesses of such two supports.

In the laminate film of the present invention, it is preferable that the gas barrier film be stacked also on the other surface of the optical functional layer, and the gas barrier film on the other surface and the optical functional layer satisfy such a different adhesion force condition from the conditions with respect to the gas barrier film on one surface that the adhesion force between the support and the barrier layer is an adhesion force not enabling peeling.

Thus, a support on the side not intended to be peeled can be prevented from being peeled, and therefore a support can be peeled from only one of the two gas barrier films stacked on both surfaces of the optical functional layer, and the support on the opposite side cannot be peeled.

In the laminate film of the present invention, it is preferable that the adhesion force enabling peeling be 0.2 N or more and 1.0 N or less.

If the adhesion force is more than 1.0 N, performances of the barrier layer and the optical functional layer in peeling are easily deteriorated, and if the adhesion force is less than 0.2 N, peeling not intended, for example, peeling in a production process, handling or the like of the laminate film, may be caused.

In the laminate film of the present invention, it is preferable that the optical functional layer contain at least one of a quantum dot and a quantum rod.

The optical functional layer contains at least one of a quantum dot and a quantum rod, and therefore can be used as a wavelength conversion member and variation in luminance and variation in chromaticity can be suppressed.

In the laminate film of the present invention, it is preferable that the barrier layer include an inorganic layer and an organic layer, and the organic layer be disposed facing the support and the inorganic layer be disposed facing the optical functional layer.

The reason is because the organic layer can serve as a coating liquid to coat the support and therefore can generally more easily satisfy the above adhesion force conditions than an inorganic layer which is formed by evaporating or scattering a film formation material.

In the laminate film of the present invention, it is preferable that the adhesion force conditions be achieved by at least one of a selection of a material of the support, a treatment for a reduction in the adhesion force to the support, and an adjustment of composition of the barrier layer.

In order to achieve the above object, the present invention provides a backlight unit using the laminate film according to any one of the above, including at least a light source and a support-free laminate film obtained by peeling the support from the laminate film.

According to the present invention, the thickness of the backlight unit can be reduced.

In order to achieve the above object, the present invention provides a liquid crystal display device including at least the above backlight unit and a liquid crystal cell.

According to the present invention, the thickness of the liquid crystal display device can be reduced.

In order to achieve the above object, the present invention provides a method for producing a laminate film, including a gas barrier film formation step of forming a gas barrier film in which a barrier layer is supported on a support, an optical functional layer formation step of forming an ultraviolet curable or thermosetting optical functional layer on the gas barrier film formed, to stack the gas barrier film on one surface of the optical functional layer, and a curing step of curing the optical functional layer, in which the gas barrier film formation step further has an adhesion force adjustment step of performing at least one of a selection of a material of the support, a treatment for a reduction in an adhesion force to the support, and an adjustment of composition of the barrier layer to thereby allow the following adhesion force conditions to be satisfied: an adhesion force between the support and the barrier layer is smaller than an adhesion force between the optical functional layer and the barrier layer, and the adhesion force between the support and the barrier layer is an adhesion force enabling peeling.

In order to achieve the above object, the present invention also provides a method for producing a laminate film, including a gas barrier film formation step of forming two gas barrier films in which a barrier layer is supported on a support, an optical functional layer formation step of forming an ultraviolet curable or thermosetting optical functional layer on one gas barrier film of the two gas barrier films formed, a barrier film lamination step of laminating the other gas barrier film on a surface of the optical functional layer opposite the surface having the one gas barrier film, to stack the gas barrier films on both surfaces of the optical functional layer, and a curing step of curing the optical functional layer, in which the gas barrier film formation step further has an adhesion force adjustment step of performing at least one of a selection of a material of the support, a treatment for a reduction in an adhesion force to the support, and an adjustment of composition of the barrier layer with respect to the gas barrier film on at least one surface of both surfaces of the optical functional layer, and the optical functional layer to thereby allow the following adhesion force conditions: an adhesion force between the support and the barrier layer is smaller than an adhesion force between the optical functional layer and the barrier layer, and the adhesion force between the support and the barrier layer is an adhesion force enabling peeling; to be satisfied.

A laminate film produced according to the production method of the present invention enables to inhibit the optical functional layer from being degraded due to ingress of oxygen and/or steam to the optical functional layer and to reduce the thickness of the backlight unit in use inside the backlight.

The present invention enables to inhibit the optical functional layer from being degraded due to ingress of oxygen and/or steam to the optical functional layer, and to reduce the thickness of backlight in use inside the backlight. Accordingly, the present invention is suitable for, in particular, a liquid crystal display device for a mobile application in which a thin thickness is demanded.

BRIEF DESCRIPTION OF THE DRAWINGS

FIG. 7 is a table of Example 2.

DETAILED DESCRIPTION OF THE EMBODIMENTS

Hereinafter, the laminate film, the backlight unit including the laminate film, the liquid crystal display device including the backlight unit, and the method for producing a laminate film according to the present invention are described with reference to the accompanied drawings. In the present specification, the term "to" is used as meaning to encompass the numerical values described before and after the "to" as the lower limit and the upper limit.

(Laminate Film)

Figure 1A:
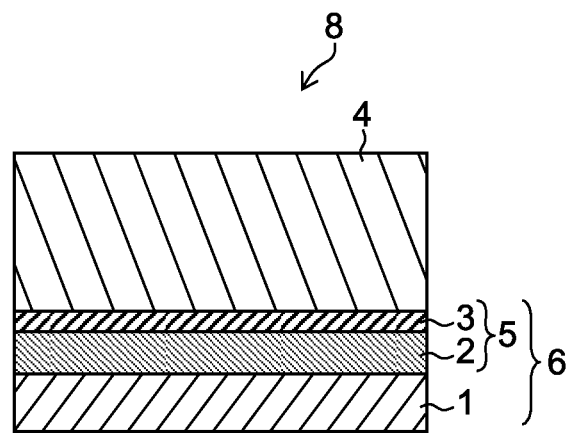
FIGS. 1A and 1B are cross-sectional views illustrating a configuration of a laminate film.

FIG. 1A is a cross-sectional view illustrating a configuration of the laminate film of the present invention, and illustrates a case where a gas barrier film having a barrier layer and a support which supports the barrier layer is stacked on one surface of an optical functional layer.

In a laminate film 8 in FIG. 1A, a gas barrier film 6, in which a barrier layer 5 having an organic layer 2 and an inorganic layer 3 is supported by a support 1, is provided on one surface of an optical functional layer 4. In this case, when the barrier layer 5 is configured by one organic layer 2 and one inorganic layer 3, the barrier layer 5 is provided so that the support 1 is in contact with the organic layer 2 and the optical functional layer 4 is in contact with the inorganic layer 3. When the barrier layer 5 has a plurality of organic layers 2 and a plurality of inorganic layers 3, the optical functional layer 4 is not limited to be in contact with the inorganic layer 3 as long as the support 1 is in contact with the organic layer 2.

FIG. 1A illustrates a case where the gas barrier film 6 is provided on the lower side surface of the optical functional layer 4, but the gas barrier film 6 may also be provided on the upper side surface of the optical functional layer 4. This laminate film 8 satisfies the following adhesion force conditions: when the adhesion force between the support 1 and the barrier layer 5 is defined as A(N) and the adhesion force between the optical functional layer 4 and the barrier layer 5 is defined as B(N), a relationship of A<B is satisfied, and the adhesion force A between the support 1 and the barrier layer 5 is an adhesion force enabling peeling.

Thus, the gas barrier film 6 is provided on the optical functional layer 4, and therefore the optical functional layer 4 can be inhibited from being degraded due to ingress of oxygen and/or steam to the optical functional layer 4 of the laminate film 8. Furthermore, the gas barrier film 6 and the optical functional layer 4 satisfy the above adhesion force conditions, and therefore the laminate film 8 can be used, with the support 1 peeled from the laminate film 8, in use thereof inside a backlight unit described later. Thus, the thickness of the backlight unit can be reduced. Accordingly, the laminate film 8 is suitable for, in particular, a backlight unit of a liquid crystal display device for a mobile application in which a thin thickness is demanded.

Figure 1B:
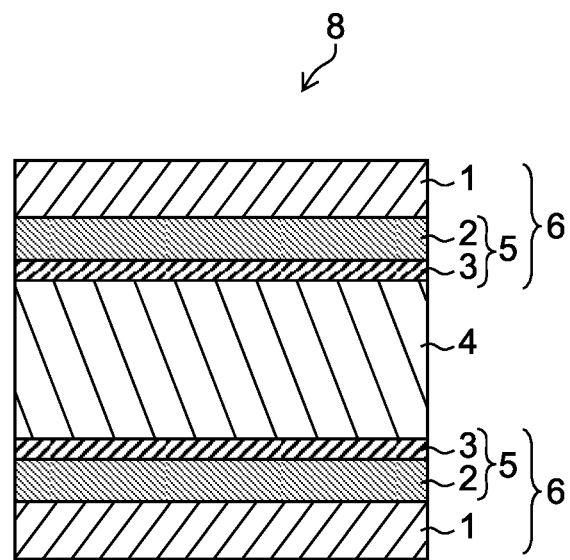

FIG. 1B is a cross-sectional view illustrating a configuration of another aspect of the laminate film of the present invention, and illustrates a case where a gas barrier film having a barrier layer and a support which supports the barrier layer is stacked on each of both surface of an optical functional layer.

In a laminate film 8 in FIG. 1B, a gas barrier film 6, in which a barrier layer 5 having an organic layer 2 and an inorganic layer 3 is supported by a support 1, is provided on each of both surfaces of an optical functional layer 4 which is interposed.

Thus, the gas barrier film 6 is provided on each of both surfaces of the optical functional layer 4, and therefore the optical functional layer 4 can be more certainly inhibited from being degraded due to ingress of oxygen and/or steam to the optical functional layer 4 than the case where the gas barrier film 6 is provided on one surface.

Moreover, the laminate film 8 can be used, with the support 1 peeled from the laminate film 8, in use thereof inside the backlight unit, and therefore the thickness of the backlight unit can be reduced as in the case of FIG. 1A.

There are two aspects when the gas barrier film 6 is provided on each of both surfaces of the optical functional layer 4. One aspect corresponds to a case where the gas barrier film 6 on each of both surfaces of the optical functional layer 4 satisfies the above adhesion force conditions. Another aspect corresponds to a case where the gas barrier film 6 on one surface of the optical functional layer 4 satisfies the above adhesion force conditions, and the gas barrier film 6 on the other surface does not satisfy the adhesion force conditions and the adhesion force between the support 1 and the barrier layer 5 is an adhesion force not enabling peeling.

Accordingly, when only the support 1 on one surface of both surfaces is intended to be peeled, the support 1 not intended to be peeled can be prevented from being peeled from the laminate film 8.

The adhesion force A for enabling peeling, between the support 1 and the barrier layer 5, is referred to as an adhesion force which is a small peeling force so as not to impair performances of the barrier layer 5 or the optical functional layer 4, and which can peel the support 1 from the laminate film 8, and is specifically preferably in the range from 0.2 N or more to 1.0 N or less, further preferably in the range from 0.2 N or more to 0.8 N or less.

If the adhesion force is more than 1.0 N, performances of the barrier layer 5 or the optical functional layer 4 are easily impaired in peeling of the support 1, and if the adhesion force is less than 0.2 N, the support 1 may be peeled in not intended to be peeled, for example, peeling of the support 1 in a production process, handling or the like of the laminate film 8 may be caused.

The adhesion force not enabling peeling between the support 1 and the barrier layer 5 is referred to as strong adhesion between the support 1 and the barrier layer 5 so that performances of the barrier layer 5 or the optical functional layer 4 may be impaired in peeling of the support 1 from the laminate film 8. Specifically, the adhesion force is a numerical value more than 1.0 N, preferably 1.5 N or more.

With respect to the method for measuring the adhesion force, the adhesion force can be measured as a peeling force required for peeling the support 1 from a test piece of 1 inch in width cut out from the laminate film 8 by using a tensile tester. For example, ASTM standard (standard established and issued by American Society for Testing and Materials) D1876 can be used.

The above adhesion force conditions can be achieved by the following methods.

(1) Selection of material of support . . . . In general, a plastic film for use as a support material has often poor adhesion property (also referred to as poor bonding property). For example, a polyolefin type plastic such as PET (polyethylene terephthalate), PEN (polyethylene naphthalate), polypropylene or polyethylene is small in adhesion force. Accordingly, such a support material can be selected as the support 1, and moreover, a surface of the support 1, being in contact with the barrier layer 5, is used without being undercoated with an easily bonding layer, being subjected to an easily bonding treatment (corona treatment, blast treatment, plasma treatment, primer treatment or the like), or the like.

The method for forming the easily bonding layer here includes a method in which a polymer of urethane-proester is dissolved in toluene and the like and the support 1 is coated therewith (coating for dissolving a surface of the support 1) to allow the polymer to penetrate in the support 1 before stretching of the support 1, thereby forming the easily bonding layer on the support surface.

(2) When the adhesion force between the support 1 and the barrier layer 5 does not achieve the adhesion force enabling peeling (1 N or less) only by the selection of the material of the support, a treatment for the reduction in the adhesion force to the support 1 can be performed. Examples of the treatment for the reduction in the adhesion force can include coating of a surface of the support 1, being in contact with the barrier layer 5, with a release agent (for example, a silicone type release agent) or an antistatic agent.

(3) When the barrier layer 5 is configured by the organic layer 2 in surface contact with the support, and the inorganic layer 3 in surface contact with the optical functional layer 4, an adjustment of the composition of the organic layer can be performed in which the composition of the organic layer 2 in surface contact with the support 1 is adjusted so that the adhesion force is small. Examples of the adjustment of the composition of the organic layer include selection of a resin having a small adhesion force, as a resin serving as a base for the organic layer. A tri- or higher functional acrylic (or methacrylic) monomer having a molecular weight of less than 2000 can be used as the resin material of the organic layer 2 and radical polymerized for curing, to allow the organic layer 2 to be harder, thereby decreasing the adhesion force of the organic layer 2 to the support 1.

A coating liquid for organic layer formation can be diluted with a solvent such as MEK (methyl ethyl ketone), acetone or MIBK (methyl isobutyl ketone) for coating and not alkalized to thereby reduce the adhesion force of the organic layer.

There is also a method in which a filler (for example, fine particle) is contained in the organic layer as long as optical properties of the laminate film is not problematic.

(4) On the other hand, a surface of the barrier layer 5, being in surface contact with the optical functional layer 4, can be undercoated with the easily bonding layer and thereafter the optical functional layer 4 can be provided by coating, to thereby increase the adhesion force between the optical functional layer 4 and the barrier layer 5. For the easily bonding layer, a known easily bonding layer such as a styrene butadiene type latex, a vinylidene chloride latex, or a combination of a self-emulsification type isocyanate compound and an aqueous polyurethane can be adopted.

A polyfunctional monomer or a silane coupling agent can be contained in the optical functional layer 4 to thereby increase the adhesion force between the optical functional layer 4 and the barrier layer 5.

Thus, the adhesion force between the optical functional layer 4 and the barrier layer 5 is increased to thereby allow a relationship of A<B to be easily satisfied under the assumption that the adhesion force between the support 1 and the barrier layer 5 is defined as A(N) and the adhesion force between the optical functional layer 4 and the barrier layer 5 is defined as B(N).

(Optical Functional Layer)

The optical functional layer means a layer such as a wavelength conversion layer, a high refractive index layer, a medium refractive index layer, a low refractive index layer, an antiglare layer, an antiglare and antireflection layer, an intermediate layer, and a hard coat layer. In the present embodiment, it is preferable that the optical functional layer be used as, in particular, a wavelength conversion layer including at least any one of a quantum dot and a quantum rod which are excited by incident excitation light to emit fluorescent light.

When the optical functional layer is used as a wavelength conversion layer, the optical functional layer is formed by including the quantum dot or the quantum rod, a curable compound, a thixotropic agent, a polymerization initiator, a silane coupling agent, and the like. The optical functional layer is formed by mixing these respective components to prepare a coating liquid for optical functional layer formation (hereinafter, also referred to as "coating liquid"), coating the gas barrier film with the coating liquid, and irradiating the resultant with light.

<Quantum Dot and Quantum Rod>

The quantum dot is a fine particle of a compound semiconductor having a size of several nm to several tens nm, and is at least excited by incident excitation light to emit fluorescent light.

The quantum dot included in the optical functional layer of the present embodiment can include at least one quantum dot, or also two or more quantum dots having a different luminescence property. A known quantum dot includes a quantum dot (A) having a center emission wavelength in the wavelength band in the range from 600 nm to 680 nm, a quantum dot (B) having a center emission wavelength in the wavelength band in the range from 500 nm to 600 nm, and a quantum dot (C) having a center emission wavelength in the wavelength band in the range from 400 nm to 500 nm, and the quantum dot (A) is excited by excitation light to emit red light, the quantum dot (B) is excited by excitation light to emit green light and the quantum dot (C) is excited by excitation light to emit blue light. For example, when blue light is incident as excitation light to an optical functional layer including the quantum dot (A) and the quantum dot (B), red light emitted from the quantum dot (A), green light emitted from the quantum dot (B) and blue light penetrating through the optical functional layer can realize white light. Alternatively, ultraviolet light can be incident as excitation light to a laminate film having an optical functional layer including the quantum dots (A), (B) and (C), thereby allowing red light emitted from the quantum dot (A), green light emitted from the quantum dot (B) and blue light emitted from the quantum dot (C) to realize white light.

With respect to the quantum dot, those described in, for example, paragraphs 0060 to 0066 in Japanese Patent Application Laid-Open No. 2012-169271 can be referenced, but the quantum dot is not limited to those. For the quantum dot, a commercialized product can be used without any limitation. The emission wavelength of the quantum dot can be usually adjusted by the composition and the size of a particle.

The quantum dot may be added into the coating liquid in the form of a particle or in the form of a dispersion liquid in which the quantum dot is dispersed. It is preferable that the quantum dot be added in the form of the dispersion liquid, from the viewpoint of suppressing aggregation of a quantum dot particle. The solvent used here is not particularly limited. It is preferable, however, that the coating liquid contain substantially no volatile organic solvent. Therefore, when the quantum dot is added to the coating liquid in the form of the dispersion liquid in which the quantum dot is dispersed, it is preferable that a step of drying the solvent of the coating liquid be included before the gas barrier film is coated with the coating liquid to form the optical functional layer. From the viewpoint of decreasing the step of drying the solvent, it is also preferable that the quantum dot be added into the coating liquid in the state of the particle.

Herein, the volatile organic solvent refers to a compound which has a boiling point of 160° C. or lower, which does not cure the curable compound in the coating liquid by external stimulus, and which is a liquid compound at 20° C. The boiling point of the volatile organic solvent is 160° C. or lower, further preferably 115° C. or lower, most preferably 30° C. or higher and 100° C. or lower.

When the coating liquid contains substantially no volatile organic solvent, the proportion of the volatile organic solvent in the coating liquid is preferably 10000 ppm or less, more preferably 1000 ppm or less.

The quantum dot can be added in an amount of, for example, about 0.1 to 10 parts by mass based on 100 parts by mass of the total amount of the coating liquid.

The quantum rod can also be used instead of the quantum dot. The quantum rod is a rod-like particle having an elongated shape, and has the same properties as those of the quantum dot. The amount of the quantum rod to be added and the method for adding the quantum rod to the coating liquid are the same as the amount of the quantum dot and the method for adding the quantum dot, respectively. The quantum dot and the quantum rod can also be used in combination.

<Curable Compound>

For the curable compound for use in the present embodiment, one having a polymerizable group can be widely adopted. The type of the polymerizable group is not particularly limited, and is preferably a (meth)acrylate group, a vinyl group or an epoxy group, more preferably a (meth)acrylate group, further preferably, an acrylate group. With respect to a polymerizable monomer having two or more polymerizable groups, the respective polymerizable groups may be the same or different.

—(Meth)Acrylates—

In view of transparency, adhesion property and the like of a cured film after curing, a (meth)acrylate compound such as a monofunctional or polyfunctional (meth)acrylate monomer, a polymer or prepolymer thereof, or the like is preferable. In the present invention and the present specification, the description "(meth)acrylate" is used to mean at least one or any one of acrylate and methacrylate. The same applies to the description "(meth)acryloyl" and the like.

——Bifunctional One——

The polymerizable monomer having two polymerizable groups can include a bifunctional polymerizable unsaturated monomer having two ethylenically unsaturated bond-containing groups. The bifunctional polymerizable unsaturated monomer is suitable for allowing a composition to have a low viscosity. In the present embodiment, a (meth)acrylate type compound which is excellent in reactivity and which has no problems about a remaining catalyst and the like is preferable.

In particular, neopentyl glycol di(meth)acrylate, 1,9-nonanediol di(meth)acrylate, dipropylene glycol di(meth)acrylate, tripropylene glycol di(meth)acrylate, tetraethylene glycol di(meth)acrylate, neopentylglycol hydroxypivalate di(meth)acrylate, polyethylene glycol di(meth)acrylate, dicyclopentenyl (meth)acrylate, dicyclopentenyl oxyethyl (meth)acrylate, dicyclopentanyl di(meth)acrylate, or the like is suitably used in the present invention.

The amount of the bifunctional (meth)acrylate monomer to be used is preferably 5 parts by mass or more, more preferably 10 to 80 parts by mass based on 100 parts by mass of the total amount of the curable compound included in the coating liquid, from the viewpoint that the viscosity of the coating liquid is adjusted in a preferable range.

——Tri- or Higher Functional One——

The polymerizable monomer having three or more polymerizable groups can include a polyfunctional polymerizable unsaturated monomer having three or more ethylenically unsaturated bond-containing groups. Such a polyfunctional polymerizable unsaturated monomer is excellent in terms of imparting mechanical strength. In the present embodiment, a (meth)acrylate type compound which is excellent in reactivity and which has no problems about a remaining catalyst and the like is preferable.

Specifically, ECH-modified glycerol tri(meth)acrylate, EO-modified glycerol tri(meth)acrylate, PO-modified glycerol tri(meth)acrylate, pentaerythritol triacrylate, pentaerythritol tetraacrylate, EO-modified phosphoric acid triacrylate, trimethylolpropane tri(meth)acrylate, caprolactone-modified trimethylolpropane tri(meth)acrylate, EO-modified trimethylolpropane tri(meth)acrylate, PO-modified trimethylolpropane tri(meth)acrylate, tris(acryloxyethyl)isocyanurate, dipentaerythritol hexa(meth)acrylate, dipentaerythritol penta(meth)acrylate, caprolactone-modified dipentaerythritol hexa(meth)acrylate, dipentaerythritol hydroxypenta(meth)acrylate, alkyl-modified dipentaerythritol penta(meth)acrylate, dipentaerythritol poly(meth)acrylate, alkyl-modified dipentaerythritol tri(meth)acrylate, ditrimethylolpropane tetra(meth)acrylate, pentaerythritolethoxy tetra(meth)acrylate, pentaerythritol tetra(meth)acrylate, or the like is suitable.

Among them, in particular, EO-modified glycerol tri(meth)acrylate, PO-modified glycerol tri(meth)acrylate, trimethylolpropane tri(meth)acrylate, EO-modified trimethylolpropane tri(meth)acrylate, PO-modified trimethylolpropane tri(meth)acrylate, dipentaerythritol hexa(meth)acrylate, dipentaerythritol penta(meth)acrylate, pentaerythritolethoxy tetra(meth)acrylate, or pentaerythritol tetra(meth)acrylate is suitably used in the present invention.

The amount of the polyfunctional (meth)acrylate monomer to be used is preferably 5 parts by mass or more in view of the coating film strength of the optical functional layer after curing, and preferably 95 parts by mass or less from the viewpoint of suppression of gelation of the coating liquid, based on 100 parts by mass of the total amount of the curable compound included in the coating liquid.

——Monofunctional One——

A monofunctional (meth)acrylate monomer can include acrylic acid and methacrylic acid, and derivatives thereof, more specifically, a monomer having one polymerizable unsaturated bond ((meth)acryloyl group) of (meth)acrylic acid in the molecule. Specific examples thereof include the following compounds, but the present embodiment is not limited thereto.

Examples include alkyl (meth)acrylates having 1 to 30 carbon atoms in the alkyl group, such as methyl (meth)acrylate, n-butyl (meth)acrylate, isobutyl (meth)acrylate, 2-ethylhexyl (meth)acrylate, isononyl (meth)acrylate, n-octyl (meth)acrylate, lauryl (meth)acrylate and stearyl (meth)acrylate; aralkyl (meth)acrylates having 7 to 20 carbon atoms in the aralkyl group, such as benzyl (meth)acrylate; alkoxyalkyl (meth)acrylates having 2 to 30 carbon atoms in the alkoxyalkyl group, such as butoxyethyl (meth)acrylate; aminoalkyl (meth)acrylates having 1 to 20 carbon atoms in total in the (monoalkyl or dialkyl)aminoalkyl group, such as N,N-dimethylaminoethyl (meth)acrylate; polyalkylene glycol alkyl ether (meth)acrylates having 1 to 10 carbon atoms in the alkylene chain and having 1 to 10 carbon atoms in the terminal alkyl ether, such as diethylene glycol ethyl ether (meth)acrylate, triethylene glycol butyl ether (meth)acrylate, tetraethylene glycol monomethyl ether (meth)acrylate, hexaethylene glycol monomethyl ether (meth)acrylate, octaethylene glycol monomethyl ether (meth)acrylate, nonaethylene glycol monomethyl ether (meth)acrylate, dipropylene glycol monomethyl ether (meth)acrylate, heptapropylene glycol monomethyl ether (meth)acrylate and tetraethylene glycol monoethyl ether (meth)acrylate; polyalkylene glycol aryl ether (meth)acrylates having 1 to 30 carbon atoms in the alkylene chain and having 6 to 20 carbon atoms in the terminal aryl ether, such as hexaethylene glycol phenyl ether (meth)acrylate; (meth)acrylate having an alicyclic structure and having 4 to 30 carbon atoms in total, such as cyclohexyl (meth)acrylate, dicyclopentanyl (meth)acrylate, isobornyl (meth)acrylate and methylene oxide addition cyclodecatriene (meth)acrylate; fluorinated alkyl (meth)acrylates having 4 to 30 carbon atoms in total, such as heptadecafluorodecyl (meth)acrylate; (meth)acrylates having a hydroxyl group, such as 2-hydroxyethyl (meth)acrylate, 3-hydroxypropyl (meth)acrylate, 4-hydroxybutyl (meth)acrylate, triethylene glycol mono(meth)acrylate, tetraethylene glycol mono(meth)acrylate, hexaethylene glycol mono(meth)acrylate, octapropylene glycol mono(meth)acrylate and glycerol mono or di(meth)acrylate; (meth)acrylates having a glycidyl group, such as glycidyl (meth)acrylate; polyethylene glycol mono(meth)acrylates having 1 to 30 carbon atoms in the alkylene chain, such as tetraethylene glycol mono(meth)acrylate, hexaethylene glycol mono(meth)acrylate and octapropylene glycol mono(meth)acrylate; and (meth)acrylamides such as (meth)acrylamide, N,N-dimethyl (meth)acrylamide, N-isopropyl (meth)acrylamide, 2-hydroxyethyl (meth)acrylamide and acryloylmorpholine.

The amount of the monofunctional (meth)acrylate monomer to be used is preferably 10 parts by mass or more, more preferably 10 to 80 parts by mass based on 100 parts by mass of the total amount of the curable compound included in the coating liquid, from the viewpoint of adjusting the viscosity of the coating liquid in a preferable range.

—Epoxy Type Compound and the Like—

The polymerizable monomer for use in the present embodiment can include a compound having a cyclic group such as a ring-opening polymerizable cyclic ether group such as an epoxy group and an oxetanyl group. Such a compound can more preferably include a compound having a compound (epoxy compound) having an epoxy group. The compound having an epoxy group or an oxetanyl group is used in combination with the (meth)acrylate type compound to thereby tend to enhance adhesion property with the barrier layer.

Examples of the compound having an epoxy group can include polyglycidyl esters of polybasic acid, polyglycidyl ethers of polyhydric alcohol, polyglycidyl ethers of polyoxyalkylene glycol, polyglycidyl ethers of aromatic polyol, hydrogenated compounds of polyglycidyl ethers of aromatic polyol, urethane polyepoxy compounds, and epoxidized polybutadienes. These compounds can be used singly or as a mixture of two or more.

Examples of other compound having an epoxy group, which can be preferably used, can include aliphatic cyclic epoxy compounds, bisphenol A diglycidyl ethers, bisphenol F diglycidyl ethers, bisphenol S diglycidyl ethers, brominated bisphenol A diglycidyl ethers, brominated bisphenol F diglycidyl ethers, brominated bisphenol S diglycidyl ethers, hydrogenated bisphenol A diglycidyl ethers, hydrogenerated bisphenol F diglycidyl ethers, hydrogenated bisphenol S diglycidyl ethers, 1,4-butanediol diglycidyl ethers, 1,6-hexanediol diglycidyl ethers, glycerin triglycidyl ethers, trimethylolpropane triglycidyl ethers, polyethylene glycol diglycidyl ethers and polypropylene glycol diglycidyl ethers; polyglycidyl ethers of polyether polyol, obtained by adding one, or two or more alkylene oxides to an aliphatic polyhydric alcohol such as ethylene glycol, propylene glycol or glycerin; diglycidyl esters of aliphatic long chain dibasic acid; monoglycidyl ethers of aliphatic higher alcohol; monoglycidyl ethers of polyether alcohol, obtained by adding an alkylene oxide to phenol, cresol, butyl phenol or these phenols; and glycidyl esters of higher fatty acid.

Among these components, aliphatic cyclic epoxy compounds, bisphenol A diglycidyl ethers, bisphenol F diglycidyl ethers, hydrogenated bisphenol A diglycidyl ethers, hydrogenated bisphenol F diglycidyl ethers, 1,4-butanediol diglycidyl ethers, 1,6-hexanediol diglycidyl ethers, glycerin triglycidyl ethers, trimethylolpropane triglycidyl ethers, neopentyl glycol diglycidyl ethers, polyethylene glycol diglycidyl ethers and polypropylene glycol diglycidyl ethers are preferable.

A commercialized product which can be suitably used as the compound having an epoxy group or an oxetanyl group can include UVR-6216 (produced by Union Carbide Corporation), glycidol, AOEX24, Cyclomer A200, Celloxide 2021P and Celloxide 8000 (these produced by Daicel Corporation), 4-vinylcyclohexene dioxide produced by Sigma Aldrich, Epikote 828, Epikote 812, Epikote 1031, Epikote 872 and Epikote CT508 (these produced by Yuka Shell Epoxy K.K.), and KRM-2400, KRM-2410, KRM-2408, KRM-2490, KRM-2720 and KRM-2750 (these produced by Adeka Corporation). These can be used singly or in combinations of two or more.

Such a compound having an epoxy group or an oxetanyl group can be synthesized with reference to Literatures such as Fourth Edition Experimental Chemistry Course 20 Organic Synthesis II, p. 213, 1992, published by Maruzen Inc.; Ed. by Alfred Hasfner, The chemistry of heterocyclic compounds-Small Ring Heterocycles part 3 Oxiranes, John & Wiley and Sons, An Interscience Publication, New York, 1985; Yoshimura, Bonding, vol. 29, No. 12, 32, 1985; Yoshimura, Bonding, vol. 30, No. 5, 42, 1986; Yoshimura, Bonding, vol. 30, No. 7, 42, 1986; Japanese Patent Application Laid-Open No. 11-100378; Japanese Patent No. 2906245; and Japanese Patent No. 2926262, although any production method may be adopted.

For the curable compound for use in the present embodiment, a vinyl ether compound may also be used.

As the vinyl ether compound, a known vinyl ether compound can be appropriately selected, and, for example, one described in paragraph 0057 in Japanese Patent Application Laid-Open No. 2009-073078 can be preferably adopted.

Such a vinyl ether compound can be synthesized by, for example, the method described in Stephen. C. Lapin, Polymers Paint Colour Journal. 179 (4237), 321 (1988), namely, by a reaction of a polyhydric alcohol or a polyhydric phenol with acetylene, or a reaction of a polyhydric alcohol or a polyhydric phenol with a halogenated alkyl vinyl ether, and such method and reactions can be used singly or in combinations of two or more.

For the coating liquid in the present embodiment, a silsesquioxane compound having a reactive group described in Japanese Patent Application Laid-Open No. 2009-073078 can also be used from the viewpoints of a decrease in viscosity and an increase in hardness.

<Thixotropic Agent>

The thixotropic agent is an inorganic compound or an organic compound.

—Inorganic Substance—

One preferable aspect of the thixotropic agent is a thixotropic agent of an inorganic substance, and, for example, a needle-like compound, a chain-like compound, a flattened compound or a layered compound can be preferably used. In particular, a layered compound is preferable.

The layered compound is not particularly limited, and includes talc, mica, feldspar, kaolinite (kaolin clay), pyrophyllite (pyrophyllite clay), sericite (sericite), bentonite, smectite and vermiculite (montmorillonite, beidellite, nontronite, saponite and the like), organic bentonite, and organic smectite.

These can be singly or in combinations of two or more. Examples of a commercially available layered compound include, as inorganic compounds, Crown Clay, Burgess Clay #60, Burgess Clay KF and OptiWhite (these produced by Shiraishi Kogyo Kaisha Ltd.), Kaolin JP-100, NN Kaolin Clay, ST Kaolin Clay and Hardsil (these produced by Tsuchiya Kaolin Ind., Ltd.), ASP-072, Satintonplus, Translink 37 and Hydrousdelami NCD (these produced by Angel Hard Corporation), SY Kaolin, OS Clay, HA Clay and MC Hard Clay (these produced by Maruo Calcium Co., Ltd.), Rucentite SWN, Rucentite SAN, Rucentite STN, Rucentite SEN and Rucentite SPN (these produced by Co-op Chemical Co., Ltd.), Sumecton (produced by Kunimine Industries Co., Ltd.), Bengel, Bengel FW, Esben, Esben 74, Organite and Organite T (these produced by Hojun Co., Ltd.), Hodaka Jirushi, Orben, 250M, Bentone 34 and Bentone 38 (these produced by Wilbur-Ellis Company), and Laponite, Laponite RD and Laponite RDS (these produced by Nippon Silica Industrial Co., Ltd.). Such a compound may also be dispersed in a solvent.

The thixotropic agent to be added to the coating liquid is, among layered inorganic compounds, a silicate compound represented by $xM(I)_2O.ySiO_2$ (also including a compound corresponding to $M(II)O$ or $M(III)_2O_3$ having an oxidation number of 2 or 3; x and y represent a positive number), and a further preferable compound is a swellable layered clay mineral such as hectorite, bentonite, smectite or vermiculite.

Particularly preferably, a layered (clay) compound modified by an organic cation (a silicate compound in which an interlayer cation such as sodium is exchanged with an organic cation compound) can be suitably used, and examples include sodium magnesium silicate (hectorite) in which a sodium ion is exchanged with an ammonium ion described below.

Examples of the ammonium ion include a monoalkyltrimethylammonium ion, a dialkyldimethylammonium ion and a trialkylmethylammonium ion having an alkyl chain having 6 to 18 carbon atoms, a dipolyoxyethylene-palm-oil-alkylmethylammonium ion and a bis(2-hydroxyethyl)-palm-oil-alkylmethylammonium ion having 4 to 18 oxyethylene chains, and a polyoxypropylene methyldiethylammonium ion having 4 to 25 oxopropylene chains. These ammonium ions can be used singly or in combinations of two or more.

The method for producing an organic cation-modified silicate mineral in which a sodium ion of sodium magnesium silicate is exchanged with an ammonium ion is as follows: sodium magnesium silicate is dispersed in water and sufficiently stirred, and thereafter left to still stand for 16 hours or more to prepare a 4% by mass dispersion liquid; while this dispersion liquid is stirred, a desired ammonium salt is added in an amount of 30% by mass to 200% by mass relative to sodium magnesium silicate; after the addition, cation exchange occurs to allow hectorite including an ammonium salt between layers to be insoluble in water and precipitated, and therefore the precipitate is taken by filtration and dried. In the preparation, heating may also be performed for the purpose of accelerating the dispersion.

A commercialized product of the alkylammonium-modified silicate mineral includes Rucentite SAN, Rucentite SAN-316, Rucentite STN, Rucentite SEN and Rucentite SPN (these produced by Co-op Chemical Co., Ltd.), and these can be used singly or in combinations of two or more.

In the present embodiment, silica, alumina, silicon nitride, titanium dioxide, calcium carbonate, zinc oxide or the like can be used for the thixotropic agent of an inorganic substance. Such a compound can also be if necessary subjected to a treatment for regulating hydrophilicity or hydrophobicity of the surface.

—Organic Substance—

For the thixotropic agent, a thixotropic agent of an organic substance can be used.

Examples of the thixotropic agent of an organic substance include an oxidized polyolefin and a modified urea.

The above oxidized polyolefin may be independently prepared, or a commercialized product may be used. Examples of the commercialized product include Disperlon 4200-20 (trade name, produced by Kusumoto Chemicals, Ltd.) and Flownon SA300 (trade name, produced by Kyoeisha Chemical Co., Ltd.).

The modified urea described above is a reaction product of an isocyanate monomer or an adduct thereof with an organic amine. The modified urea described above may be independently prepared, or a commercialized product may be used. Examples of the commercialized product include BYK 410 (produced by BYK).

—Content—

The content of the thixotropic agent in the coating liquid is preferably 0.15 to 20 parts by mass, more preferably 0.2 to 10 parts by mass, particularly preferably 0.2 to 8 parts by mass, based on 100 parts by mass of the curable compound. In particular, in the case of the thixotropic agent of an inorganic substance, a content of 20 parts by mass or less based on 100 parts by mass of the curable compound allows brittleness to be improved.

<Polymerization Initiator>

The coating liquid can include a known polymerization initiator as a polymerization initiator. With respect to the polymerization initiator, for example, paragraph 0037 in Japanese Patent Application Laid-Open No. 2013-043382 can be referenced. The polymerization initiator is preferably in an amount of 0.1% by mol or more, more preferably 0.5 to 2% by mol based on the total amount of the curable compound included in the coating liquid. The polymerization initiator is preferably included in an amount of 0.1% by mass to 10% by mass, further preferably 0.2% by mass to 8% by mass, as the percentage by mass in the entire curable composition excluding the volatile organic solvent.

<Silane Coupling Agent>

The optical functional layer formed from the coating liquid including the silane coupling agent can exhibit excellent durability because of being strong in adhesion property to an adjacent layer due to the silane coupling agent. The optical functional layer formed from the coating liquid including the silane coupling agent is also preferable in view of build-up of a relationship of A<B in the above adhesion force conditions. Such build-up is mainly based on a hydrolysis reaction or a condensation reaction of the silane coupling agent included in the optical functional layer for formation of a covalent bond with the surface of the adjacent layer and the constituent component of the optical functional layer. When the silane coupling agent has a reactive functional group such as a radical polymerizable group, formation of a crosslinking structure with a monomer component forming the optical functional layer can also provide enhancement in adhesion property to the adjacent layer to the optical functional layer.

For the silane coupling agent, a known silane coupling agent can be used without any limitation. A preferable silane coupling agent in terms of adhesion property can include a silane coupling agent represented by the following general formula (1) described in Japanese Patent Application Laid-Open No. 2013-043382.

General formula (1)

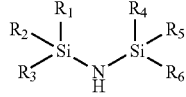

[Formula 1]

(wherein $R_1$ to $R_6$ each independently represent a substituted or unsubstituted alkyl group or aryl group, provided that at least one of $R_1$ to $R_6$ represents a substituent including a radical polymerizable carbon-carbon double bond.)

$R_1$ to $R_6$ each independently represent a substituted or unsubstituted alkyl group or aryl group. $R_1$ to $R_6$ each preferably represent an unsubstituted alkyl group or an unsubstituted aryl group except for a case where $R_1$ to $R_6$ each represent a substituent including a radical polymerizable carbon-carbon double bond. The alkyl group is preferably an alkyl group having 1 to 6 carbon atoms, more preferably a methyl group. The aryl group is preferably a phenyl group. $R_1$ to $R_6$ each particularly preferably represent a methyl group.

At least one of $R_1$ to $R_6$ has a substituent including a radical polymerizable carbon-carbon double bond, and preferably, two of $R_1$ to $R_6$ have a substituent including a radical polymerizable carbon-carbon double bond. Furthermore, it is particularly preferable that one of $R_1$ to $R_3$ have a substituent including a radical polymerizable carbon-carbon double bond and one of $R_4$ to $R_6$ have a substituent including a radical polymerizable carbon-carbon double bond.

When the silane coupling agent represented by the following general formula (1) has two or more substituents including a radical polymerizable carbon-carbon double bond, the respective substituents may be the same or different, and are preferably the same.

It is preferable that the substituent including a radical polymerizable carbon-carbon double bond be represented by —X—Y: wherein X represents a single bond, an alkylene group having 1 to 6 carbon atoms, or an arylene group, preferably represents a single bond, a methylene group, an ethylene group, a propylene group or a phenylene group; and Y represents a radical polymerizable carbon-carbon double bond group, preferably an acryloyloxy group, a methacryloyloxy group, an acryloylamino group, a methacryloylamino group, a vinyl group, a propenyl group, a vinyloxy group or a vinylsulfonyl group, more preferably a (meth)acryloyloxy group.

$R_1$ to $R_6$ may also have a substituent other than the substituent including a radical polymerizable carbon-carbon double bond. Examples of such a substituent include alkyl groups (such as a methyl group, an ethyl group, an isopropyl group, a tert-butyl group, a n-octyl group, a n-decyl group, a n-hexadecyl group, a cyclopropyl group, a cyclopentyl group and a cyclohexyl group), aryl groups (such as a phenyl group and a naphthyl group), halogen atoms (such as fluorine, chlorine, bromine and iodine), acyl groups (such as an acetyl group, a benzoyl group, a formyl group and a pivaloyl group), acyloxy groups (such as an acetoxy group, an acryloyloxy group and a methacryloyloxy group), alkoxycarbonyl groups (such as a methoxycarbonyl group and an ethoxycarbonyl group), aryloxycarbonyl groups (such as a phenyloxycarbonyl group), and sulfonyl groups (such as a methanesulfonyl group and a benzenesulfonyl group).

The silane coupling agent is preferably included in the coating liquid in the range from 1 to 30% by mass, more preferably 3 to 30% by mass, further preferably 5 to 25% by mass, from the viewpoint of a further more enhancement in adhesion property to the adjacent layer.

In the present embodiment, the volatile organic solvent described above can be used in the coating liquid. A preferable aspect is an aspect in which the coating liquid substantially contains no volatile organic solvent. In another aspect, the volatile organic solvent can be contained in the coating liquid, can be contained in, for example, an amount of 10% by mass or more and 50% by mass or less, and can also be contained in an amount of 10% by mass or more and 40% by mass or less. With respect to specific examples of the solvent which can be used, paragraphs 0038 to 0041 in Japanese Patent Application Laid-Open No. 2013-105160 can be referenced.

(Barrier Layer)

In the laminate film 8 in the present embodiment, the gas barrier film 6 having the barrier layer 5 and the support 1 which supports the barrier layer 5 is stacked on at least one surface of the optical functional layer 4. FIGS. 1A and 1B illustrate the barrier layer 5 formed by including at least the support 1, the organic layer 2 and the inorganic layer 3, but the present invention is not limited thereto. The barrier layer 5 may be formed on one surface of the optical functional layer 4 as illustrated in FIG. 1A, or may be formed on each of both surfaces thereof as illustrated in FIG. 1B. When the barrier layer 5 is formed on each of both surfaces of the optical functional layer 4, it is preferable that the support 1 of the barrier layer 5 on at least one surface be a flexible support.

The barrier layer 5 may include at least an inorganic layer, or may include at least one inorganic layer and at least one organic layer on the flexible support 1. Such stacking of a plurality of layers is preferable from the viewpoint of enhancement in light resistance because of being capable of further more enhancing barrier property. On the other hand, the light transmittance of the wavelength conversion member tends to be reduced as the number of layers stacked is increased, and therefore it is desirable that the number of layers stacked be increased as long as a good light transmittance can be kept.

Specifically, the barrier layer 5 preferably has a total light transmittance in the visible light region of 80% or more, and preferably has an oxygen permeability of 1.00 $cm^3/(m^2 \cdot day \cdot atm)$ or less. The total light transmittance refers to the average of light transmittances over the visible light region.

The oxygen permeability of the barrier layer 5 is more preferably 0.1 $cm^3/(m^2 \cdot day \cdot atm)$ or less, particularly preferably 0.01 $cm^3/(m^2 \cdot day \cdot atm)$ or less, more particularly preferably 0.001 $cm^3/(m^2 \cdot day \cdot atm)$ or less. The oxygen permeability here is the value measured using an oxygen gas permeability measuring apparatus (manufactured by MOCON Inc., OX-TRAN 2/20: trade name) under conditions of a measurement temperature of 23° C. and a relative humidity of 90%. In addition, the visible light region refers to the wavelength band of 380 to 780 nm, and the total light transmittance represents the average of light transmittances excluding contributions of light absorption and reflection of the optical functional layer.

The total light transmittance in the visible light region is more preferably 90% or more. A lower oxygen permeability is more preferable, and a higher total light transmittance in the visible light region is more preferable.

—Flexible Support—

The barrier layer 5 has the flexible support 1 for the purposes of enhancement in strength, ease of film formation, and the like.

In FIG. 1, the gas barrier film 6 is formed so that the inorganic layer 3, the organic layer 2 and the support 1 are located in this order. The gas barrier film 6 is not limited thereto, and may be formed so that the inorganic layer 3 and the support 1 are located in this order.

It is preferable that the flexible support 1 be a transparent support which is transparent to visible light. The phrase "transparent to visible light" here refers to a light transmittance in the visible light region of 80% or more, preferably 85% or more. The light transmittance for use as a measure of transparency can be calculated by the method described in JIS-K7105, namely, by measuring the total light transmittance and the amount of light to be scattered, by use of an integrating sphere light transmittance measuring apparatus, and subtracting the diffuse transmittance from the total light transmittance. With respect to the support 1, paragraphs 0046 to 0052 in Japanese Patent Application Laid-Open No. 2007-290369 and paragraphs 0040 to 0055 in Japanese Patent Application Laid-Open No. 2005-096108 can be referenced. The thickness of the support 1 is preferably in the range from 10 to 500 μm, inter alia, preferably in the range from 15 to 300 μm, particularly preferably in the range from 15 to 120 μm, more particularly preferably in the range from 15 to 100 μm, further preferably in the range from 25 to 110 μm, more further preferably in the range from 25 to 60 μm in terms of gas barrier property, impact resistance and the like. For the flexible support 1, a commercialized product may be used, and for example, Cosmoshine A4100 produced by Toyobo Co., Ltd., which is a polyethylene terephthalate (PET) film provided with an easily bonding layer, can be used. Herein, the above adhesion force conditions are required to be satisfied between the support 1 and the barrier layer 5, and in this case, a surface not undercoated with the easily bonding layer can be used as a surface facing the barrier layer 5.

—Inorganic Layer—

The inorganic layer 3 is a layer whose dominant component is an inorganic material, and is preferably a layer formed from only an inorganic material.

It is preferable that the inorganic layer 3 be a layer having a gas barrier function of blocking oxygen. Specifically, it is preferable that the oxygen permeability of the inorganic layer 3 be 1.00 $cm^3/(m^2 \cdot day \cdot atm)$ or less. The oxygen permeation coefficient of the inorganic layer 3 can be determined by attaching the wavelength conversion layer to a detector of an oxygen concentration meter manufactured by Orbisphere Laboratories, via silicone grease, and converting the oxygen permeation coefficient from the equilibrium oxygen concentration value. It is also preferable that the inorganic layer 3 have a function of blocking steam.

Two, or three or more of the inorganic layers 3 may also be included in the barrier layer 5.

The inorganic material forming the inorganic layer 3 is not particularly limited, and various inorganic compounds such as a metal, or inorganic oxide, nitride or oxynitride can be used therefor. For element(s) forming the inorganic material, silicon, aluminum, magnesium, titanium, tin, indium and cerium are preferable, and these may be included singly or two or more. Specific examples of the inorganic compound can include silicon oxide, silicon oxynitride, aluminum oxide, magnesium oxide, titanium oxide, tin oxide, an indium oxide alloy, silicon nitride, aluminum nitride and titanium nitride. As the inorganic layer, a metal film, for example, an aluminum film, a silver film, a tin film, a chromium film, a nickel film or a titanium film may also be provided.

It is particularly preferable that the inorganic layer 3 having the above barrier property be an inorganic layer 3 including at least one compound selected from silicon nitride, silicon oxynitride, silicon oxide and aluminum oxide, among the above materials.

The reason is because the inorganic layer 3 formed from such a material is good in adhesion property to the organic layer 2, and therefore, not only, even when the inorganic layer 3 has a pinhole, the organic layer 2 can effectively fill in the pinhole to suppress fracture, but also, even when the inorganic layer 3 is stacked, an extremely good inorganic layer film can be formed to result in a further enhancement in barrier property.

The method for forming the inorganic layer 3 is not particularly limited, and for example, various film formation methods in which a film formation material can be evaporated or scattered and thus deposited on a surface onto which the material is to be vapor-deposited.

Examples of the method for forming the inorganic layer 3 include a vacuum vapor deposition method in which an inorganic material such as an inorganic oxide, an inorganic nitride, an inorganic oxynitride or a metal is heated and vapor-deposited; an oxidation reaction vapor deposition method in which an inorganic material is used as a raw material and oxidized by introduction of an oxygen gas, and thus vapor-deposited; a sputtering method in which an inorganic material is used as a target raw material and sputtered by introduction of an argon gas and an oxygen gas, and thus vapor-deposited; a physical vapor deposition method such as an ion plating method in which an inorganic material is heated by a plasma beam generated by a plasma gun and thus vapor-deposited, and in the case of formation of a vapor deposition film of silicon oxide or silicon nitride, a plasma chemical vapor deposition method (Chemical Vapor Deposition Method) in which an organosilicon compound is used as a raw material. Vapor deposition may be performed on the surface of a support, a base material film, a wavelength conversion layer, an organic layer or the like as a base material.

It is preferable that the silicon oxide film be formed from an organosilicon compound as a raw material by use of a low-temperature plasma chemical vapor deposition method. This organosilicon compound specifically includes 1,1,3,3-tetramethyldisiloxane, hexamethyldisiloxane, vinyltrimethylsilane, hexamethyldisilane, methylsilane, dimethylsilane, trimethylsilane, diethylsilane, propylsilane, phenylsilane, vinyltriethoxysilane, tetramethoxysilane, phenyltriethoxysilane, methyltriethoxysilane and octamethylcyclotetrasiloxane. Among the above organosilicon compounds, tetramethoxysilane (TMOS) or hexamethyldisiloxane (HMDSO) is preferably used because of being excellent in handleability and properties of a vapor deposition film.

The thickness of the inorganic layer 3 may be 1 nm to 500 nm, and is preferably 5 nm to 300 nm, particularly preferably 10 nm to 150 nm. The reason is because the film thickness of an adjacent inorganic layer can be in the above range to thereby not only achieve good barrier property, but also suppress reflection on the inorganic layer 3, providing a laminate film higher in light transmittance.

It is preferable that the laminate film 8 include at least one of the inorganic layer 3 adjacent to the optical functional layer 4. It is also preferable that the inorganic layer 3 be in direct contact with each of both surfaces of the optical functional layer 4.

—Organic Layer—

The organic layer 2 refers to a layer which mainly includes an organic material, in which the organic material preferably occupies 50% by mass or more, further preferably 80% by mass or more, particularly preferably 90% by mass or more.

With respect to the organic layer 2, paragraphs 0020 to 0042 in Japanese Patent Application Laid-Open No. 2007-290369 and paragraphs 0074 to 0105 in Japanese Patent Application Laid-Open No. 2005-096108 can be referenced. Herein, it is preferable that the organic layer 2 include a cardo polymer as long as the above adhesion force conditions are satisfied. The reason is because adhesion property of the organic layer 2 to an adjacent layer, in particular, also adhesion property thereof to the inorganic layer 3 can be thus improved to achieve much more excellent gas barrier property. With respect to the detail of the cardo polymer, paragraphs 0085 to 0095 in Japanese Patent Application Laid-Open No. 2005-096108 described above can be referenced. The film thickness of the organic layer 2 is preferably in the range from 0.05 μm to 10 μm, in particular, preferably in the range from 0.5 to 10 μm. When the organic layer 2 is formed by a wet coating method, the film thickness of the organic layer is preferably in the range from 0.5 to 10 μm, in particular, preferably in the range from 1 μm to 5 μm. When the organic layer 2 is formed by a dry coating method, the film thickness is preferably in the range from 0.05 μm to 5 μm, in particular, preferably in the range from 0.05 μm to 1 μm. The reason is because the film thickness of the organic layer 2 formed by a wet coating method or a dry coating method can be in the above range to thereby more improve adhesion property to the inorganic layer 3.

With respect to other details of the inorganic layer 3 and the organic layer 2, the descriptions of Japanese Patent Application Laid-Open No. 2007-290369, Japanese Patent Application Laid-Open No. 2005-096108 and furthermore US 2012/0113672 A1 can be referenced.

(Method for Producing Laminate Film)

Figure 2:
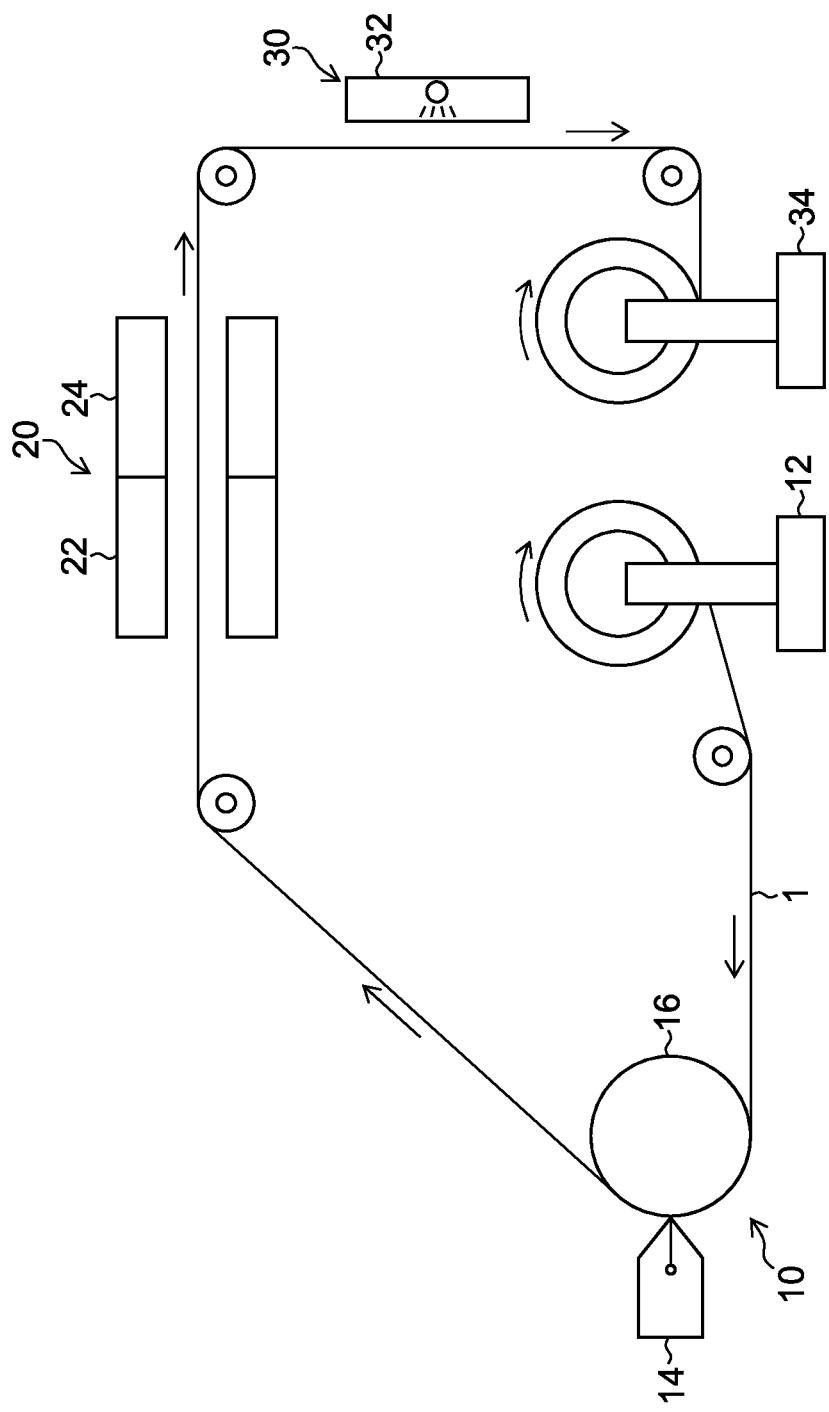
FIG. 2 is a schematic view of one example of a production facility for use in formation of an organic layer.
Figure 3:
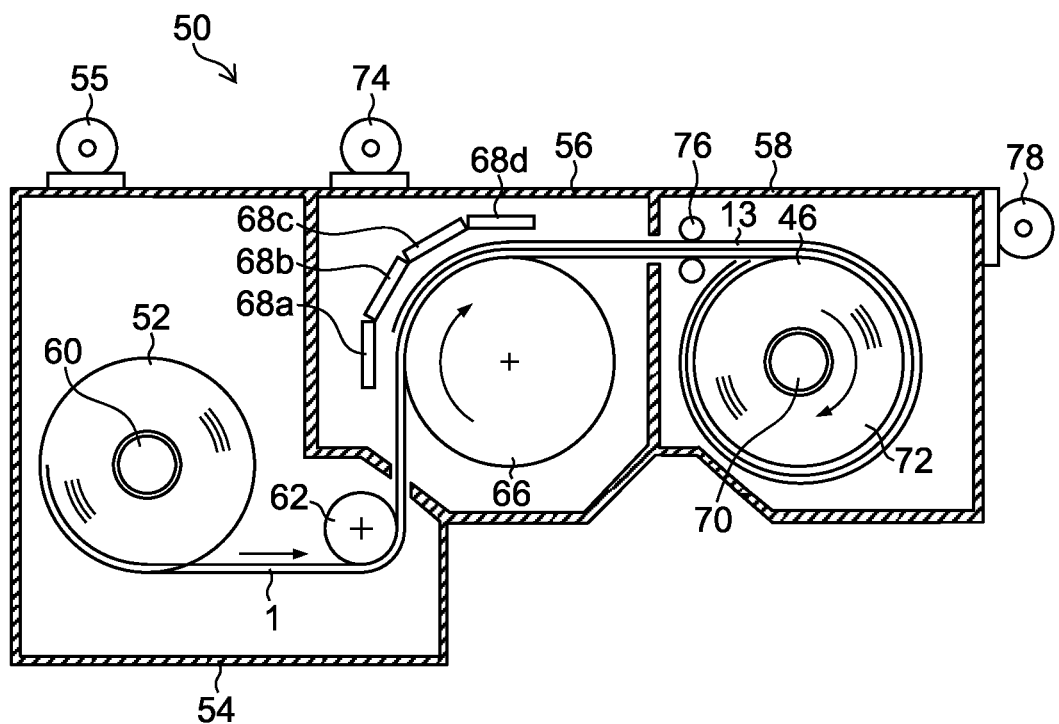
FIG. 3 is a schematic view of one example of a production facility for use in formation of an inorganic layer.
Figure 4:
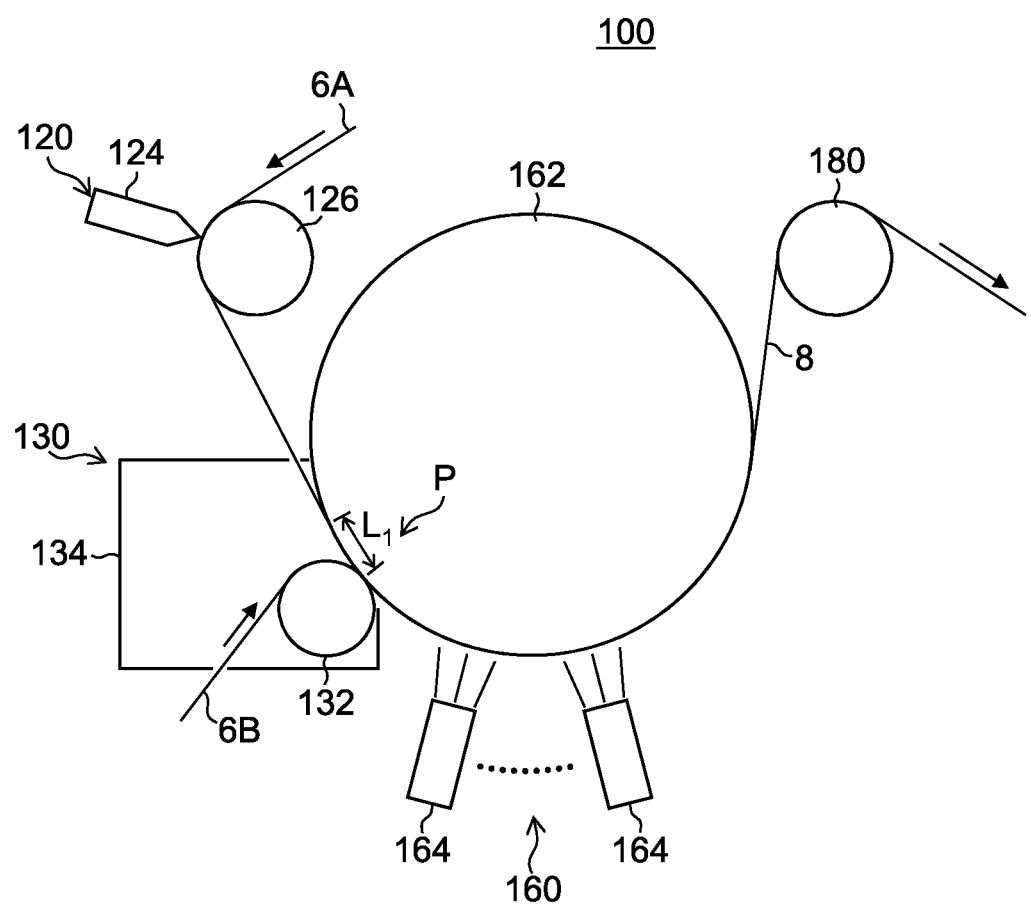
FIG. 4 is a schematic view of one example of a production facility for use in formation of the laminate film.

Next, the method for forming each of the gas barrier film 6 and the optical functional layer 4 in production of the laminate film 8 is described. FIG. 2 is a schematic view illustrating one example of a production facility for use in formation of the organic layer 2, and FIG. 3 is a schematic view illustrating one example of a production facility for use in formation of the inorganic layer 3. In addition, FIG. 4 is a schematic view illustrating one example of a production facility for use in formation of the optical functional layer 4. Herein, the apparatuses illustrated in FIG. 2 to FIG. 4 are merely examples, and the respective layers can be formed by the methods described above.

(Gas Barrier Film Formation Step)

In organic layer formation, first, the support 1 is continuously conveyed from a feeding machine 12 to a coating portion 10, as illustrated in FIG. 2. In the coating portion 10, the surface of the support 1 continuously conveyed is coated with a coating liquid for organic layer formation, and the organic layer 2 is formed. In this case, it is preferable that at least one of the support 1 and the organic layer 2 be subjected to the above (1) to (3) for achieving the above adhesion force conditions, in order that the organic layer 2 and the support 1 can be peeled from each other. It is also preferable that a bonding layer or an easily bonding layer be not interposed at the interface between the organic layer 2 and the support 1.

In the coating portion 10, for example, a die coater 14, and a back-up roller 16 arranged opposite to the die coater 14 are disposed. An opposite surface to a surface on which the organic layer is to be formed, of the support 1, is rolled around the back-up roller 16, the surface of the support 1 continuously conveyed is coated with the coating liquid for organic layer formation through a discharge port of the die coater 14, and the organic layer 2 is formed.

The support 1 coated with the coating liquid for organic layer formation is conveyed to a drying portion 20. The drying portion 20 includes a drying apparatus 22 and a heating apparatus 24, and dries the coating liquid for organic layer formation, with which the support 1 is coated. The drying apparatus 22 evaporates a solvent included in the organic layer. The heating apparatus 24 may also be if necessary used in heating for removal of the solvent and in film curing.

The support 1 dried in the drying portion 20 is conveyed to an ultraviolet irradiation portion 30. The ultraviolet irradiation portion 30 includes an ultraviolet irradiation apparatus 32, and the coating liquid for organic layer formation is irradiated with ultraviolet light by an ultraviolet lamp. A monomer and the like in the coating liquid for organic layer formation are crosslinked by ultraviolet light to form the organic layer 2.

The support 1 with the organic layer 2 formed thereon by the ultraviolet irradiation portion 30 is subjected to attachment of a protection film (not illustrated) onto the organic layer 2, and the support 1 is rolled up by a roll-up machine 34 in a roll shape and recovered. While there is described, in FIG. 2, an apparatus in which the protection film is attached to the support 1 and the resultant is rolled up by the roll-up machine 34, the support 1 may also be subjected to the next step (inorganic layer formation or the like) as it is without attachment of the protection film.

The inorganic layer 3 can be formed by a roll-to-roll type vacuum film formation apparatus as illustrated in FIG. 3. An inorganic film production apparatus 50 in FIG. 3 is an apparatus which forms the inorganic layer 3 on the organic layer 2.

The support 1 with the organic layer 2 formed thereon, which is rolled up by the roll-up machine 34, is filled as a support roll 52 in a rotation shaft 60 of a support supply chamber 54.

In the support supply chamber 54, the rotation shaft 60 is rotated in a counterclockwise direction in the Figure by a driving source not illustrated, to feed the support 1 from the support roll 52, and a guide roller 62 guides the support 1 to a predetermined route to feed the support 1 to an inorganic film formation chamber 56. In the process of feeding the support 1 to the inorganic film formation chamber 56, the protection film attached after organic layer formation is peeled. The support supply chamber 54 is a vacuum chamber, and is evacuated to a predetermined pressure (degree of vacuum) by a vacuum evacuation device 55. In the inorganic film production apparatus 50, the pressure of the support supply chamber 54 is inhibited from adversely affecting formation of an inorganic film in the inorganic film formation chamber 56, described later.

The inorganic film formation chamber 56 is configured to have a drum 66, film formation devices 68a, 68b, 68c and 68d, and a vacuum evacuation device 74. When the inorganic layer 3 is obtained by performing film formation by sputtering, plasma CVD or the like, a high-frequency power source or the like is also disposed for the inorganic film formation chamber 56.

The support 1 conveyed from the support supply chamber 54 is hung around a predetermined region on the periphery of the drum 66 and conveyed on a predetermined conveyance route with being supported/guided by the drum 66, and the inorganic layer 3 is formed on the organic layer 2 of the support 1 by the film formation devices 68a to 68d and the like.

The film formation devices 68a to 68d are used for forming the inorganic layer 3 on the organic layer 2 of the support 1 by a vacuum film formation method, and are configured by various members depending on the vacuum film formation method to be performed. For example, when film formation of the inorganic layer is performed by the CVD method, the film formation devices 68a to 68d are configured to have an introduction device of a reaction gas, and the like. When film formation of the inorganic layer 3 is performed by the sputtering method, the film formation devices 68a to 68d are configured to have a retention device of a target, a high-frequency electrode, a supply device of a sputtering gas, and the like.

The support 1 with the inorganic layer 3 formed thereon is then fed to a support roll-up chamber 58. In the support roll-up chamber 58, a rotation shaft 70 is rotated in a clockwise direction in the Figure by a driving source not illustrated, to roll up the support by a support roll 72. A touch roll 76 is provided on the conveyance route of the support 1 after formation of the inorganic layer 3, and a protection film (not illustrated) is attached by the touch roll 76. The support roll-up chamber 58 is a vacuum chamber as in the support supply chamber 54, and evacuated to a predetermined pressure (degree of vacuum) by a vacuum evacuation device 78 to inhibit formation of the inorganic layer 3 from being adversely affected.

A gas barrier film 6A in which the organic layer 2 and the inorganic layer 3 as the barrier layer 5 are formed on the support 1 is then subjected to formation of the optical functional layer 4 and lamination of additional one more gas barrier film 6B on the optical functional layer 4, to allow the optical functional layer 4 to be sandwiched between the two gas barrier films 6A and 6B. FIG. 4 illustrates one example of a production facility 100 for film formation of the optical functional layer 4.

(Optical Functional Layer Formation Step)

The gas barrier film 6A (when the protection film is laminated, the protection film is peeled) is continuously conveyed from a feeding machine not illustrated, to a coating portion 120. For example, the gas barrier film 6A is fed from the feeding machine at a conveyance rate of 1 to 50 m/min, but the conveyance rate is not limited thereto. In such feeding, for example, a tensile force of 20 to 150 N/m, preferably a tensile force of 30 to 100 N/m is applied to the gas barrier film 6A.

In the coating portion 120, the surface of the gas barrier film 6A continuously conveyed is coated with the coating liquid, and a coating film is formed. In the coating portion 120, for example, a die coater 124, and a back-up roller 126 arranged opposite to the die coater 124 are disposed. An opposite surface to a surface on which the optical functional layer 4 is to be formed, of the gas barrier film 6A, is rolled around the back-up roller 126, the surface of the gas barrier film 6A continuously conveyed is coated with the coating liquid through a discharge port of the die coater 124, and a coating film is formed. The coating film here refers to the coating liquid, with which the gas barrier film 6A is coated, before a polymerization treatment.

The die coater 124 to which an extrusion coating method is applied is illustrated as the coating apparatus in FIG. 4, but not limited thereto, and a coating apparatus to which various methods such as a curtain coating method, an extrusion coating method, a rod coating method or a roll coating method is applied can be used.

(Barrier Film Lamination Step)

The gas barrier film 6A which passes through the coating portion 120 and on which the coating film is formed is continuously conveyed to a lamination portion 130. In the lamination portion 130, the gas barrier film 6B is laminated on the coating film, and the coating film is sandwiched between the gas barrier film 6A and the gas barrier film 6B. In this case, the above adhesion force conditions are satisfied in a relationship between at least one of the gas barrier film 6A or 6B of the gas barrier film 6A and the gas barrier film 6B, and the optical functional layer 4.

A back-up roller 162 is arranged at a position opposite to a lamination roller 132. With respect to the gas barrier film 6A on which the coating film is formed, an opposite surface to the surface on which the coating film is formed is rolled around the back-up roller 162, and the gas barrier film 6A is continuously conveyed to a lamination position P. The lamination position P means a position where the gas barrier film 6B and the coating film are started to be brought into contact with each other. It is preferable that the gas barrier film 6A be rolled around the back-up roller 162 before the gas barrier film 6A reaches the lamination position P. The reason is because, even if wrinkle is generated on the gas barrier film 6A, the wrinkle can be smoothed and removed by the back-up roller 162 until the gas barrier film 6A reaches the lamination position P. Accordingly, a distance L1 from the position (contact position) where the gas barrier film 6A is rolled around the back-up roller 162, to the lamination position P is preferably longer, for example, preferably 30 mm or more, and the upper limit thereof is usually determined by the diameter and the path line of the back-up roller 162.

In the present embodiment, lamination of the gas barrier film 6B is performed by the back-up roller 162 and the lamination roller 132 for use in a polymerization treatment portion 160. That is, the back-up roller 162 for use in the polymerization treatment portion 160 also serves as a roller for use in the lamination portion 130. The present embodiment, however, is not limited to the above mode, and a roller for lamination, other than the back-up roller 162, can be separately disposed in the lamination portion 130 so as to allow the back-up roller 162 not to serve as the roller for lamination.

The back-up roller 162 for use in the polymerization treatment portion 160 can be used in the lamination portion 130 to thereby reduce the number of rollers. The back-up roller 162 can also be used as a heat roller for the gas barrier film 6A.

The gas barrier film 6B fed from the feeding machine not illustrated is rolled around the lamination roller 132, and continuously conveyed between the lamination roller 132 and the back-up roller 162. The gas barrier film 6B is laminated on the coating film formed on the gas barrier film 6A, at the lamination position P. Thus, the coating film (optical functional layer 4) is sandwiched between the gas barrier film 6A and the gas barrier film 6B. The lamination refers to overlapping of the gas barrier film 6B on the coating film for stacking.

The distance between the lamination roller 132 and the back-up roller 162 is preferably equal to or more than the value of the total thickness of the gas barrier film 6A, the optical functional layer 4 obtained by polymerization and curing of the coating film, and the gas barrier film 6B. It is preferable that the distance between the lamination roller 132 and the back-up roller 162 be equal to or less than the value obtained by adding 5 mm to the total thickness of the gas barrier film 6A, the coating film and the gas barrier film 6B. The distance between the lamination roller 132 and the back-up roller 162 can be equal to or less than the value obtained by adding 5 mm, thereby inhibiting bubbles from coming between the gas barrier film 6B and the coating film. The distance between the lamination roller 132 and the back-up roller 162 here refers to the shortest distance between the outer periphery of the lamination roller 132 and the outer periphery of the back-up roller 162.

A thermoregulator can be mounted to the main body of the back-up roller 162 to thereby adjust the temperature of the back-up roller 162.

In the step of stacking the gas barrier film 6B on the coating film, the gas barrier film 6B is preferably attached onto the coating film by nipping at a linear pressure of 5 to 300 N/cm, more preferably nipping at a linear pressure of 10 to 200 N/cm, particularly preferably nipping at a linear pressure of 30 to 100 N/cm. The attachment method is not restricted, and a method in which attachment is made without a nip roll may also be adopted.

In order to suppress thermal deformation after the coating film is sandwiched between the gas barrier film 6A and the gas barrier film 6B, the difference between the temperature of the back-up roller 162 in the polymerization treatment portion 160 and the temperature of the gas barrier film 6A, and the difference between the temperature of the back-up roller 162 and the temperature of the gas barrier film 6B are preferably 30° C. or lower, more preferably 15° C. or lower, and most preferably, these temperatures are the same.

In order to reduce the difference from the temperature of the back-up roller 162, it is preferable that the gas barrier film 6A and the gas barrier film 6B be heated in the heating chamber 134 when a heating chamber 134 is provided. For example, hot air can be supplied to the heating chamber 134 by a hot air generation apparatus not illustrated, to heat the gas barrier film 6A and the gas barrier film 6B.

The gas barrier film 6A may also be rolled around the back-up roller 162 whose temperature is adjusted, to thereby heat the gas barrier film 6A by the back-up roller 162.

On the other hand, with respect to the gas barrier film 6B, the lamination roller 132 can be used as a heat roller to thereby heat the gas barrier film 6B by the lamination roller 132. The heating chamber 134 and the heat roller, however, are not essential, and can be if necessary provided.

The case is described in FIG. 4, where the optical functional layer (coating film) are sandwiched between the gas barrier film 6A and the gas barrier film 6B on its opposite sides, and the barrier layer is provided on each of the both surfaces, but the gas barrier film 6B can also be replaced with other film or support in the case where the barrier layer is provided on only one surface of the optical functional layer.

(Curing Step)

After the coating film is formed on the gas barrier film 6A and the gas barrier film 6B is laminated thereon, the coating film can be subjected to polymerization and curing by light irradiation to provide the optical functional layer 4. The curing conditions can be appropriately set depending on the type of a curable compound to be used, and the composition of the coating liquid. When a solvent is included in the coating liquid, a drying treatment for removal of the solvent may be conducted before the polymerization treatment is performed. The polymerization treatment of the coating film is performed in the state where the coating film is sandwiched between the two gas barrier films.

In the apparatus illustrated in FIG. 4, the gas barrier film 6A, with the coating film formed thereon and the gas barrier film 6B laminated, is conveyed to the polymerization treatment portion 160. The polymerization treatment portion 160 includes the back-up roller 162, and a light irradiation apparatus 164 at a position opposite to the back-up roller 162. The gas barrier film 6A and the gas barrier film 6B which sandwich the coating film is continuously conveyed between the back-up roller 162 and the light irradiation apparatus 164.

Light to be radiated by the light irradiation apparatus 164 may be determined depending on the type of the curable compound included in the coating liquid, and examples include ultraviolet light. For the light source which emits ultraviolet light, for example, a low-pressure mercury lamp, a medium-pressure mercury lamp, a high-pressure mercury lamp, an ultrahigh-pressure mercury lamp, a carbon-arc lamp, a metal halide lamp, a xenon lamp, an LED, a laser or the like can be used. The amount of light to be radiated may be set in the range so as to allow polymerization and curing of the coating film to progress, and for example, ultraviolet light can be radiated toward the coating film in an amount to be radiated of 10 to 10000 $mJ/cm^2$. The amount of light to be radiated toward the coating film can be, for example, 10 to 10000 $mJ/cm^2$, and is preferably 10 to 1000 $mJ/cm^2$, more preferably 50 to 800 $mJ/cm^2$.

In the polymerization treatment portion 160, while the coating film is sandwiched between the gas barrier film 6A and the gas barrier film 6B, the gas barrier film 6A can be irradiated with light from the light irradiation apparatus 164 with being rolled around the back-up roller 162 and being continuously conveyed, thereby curing the coating film to form the optical functional layer.

In the present embodiment, the gas barrier film 6A is rolled around the back-up roller 162 and continuously conveyed, but the gas barrier film 6B can also be rolled around the back-up roller 162 and continuously conveyed.

The phrase "rolled around the back-up roller 162" refers to a state where any of the gas barrier film 6A and the gas barrier film 6B is in contact with the surface of the back-up roller 162 at a certain lap angle. Accordingly, the gas barrier film 6A and the gas barrier film 6B are moved in synchronization with the rotation of the back-up roller 162, while these are continuously conveyed. Rolling around the back-up roller 162 may be performed at least during irradiation with light.

The temperature of the back-up roller 162 can be determined in consideration of heat generation in light irradiation, the curing efficiency of the coating film, and generation of wrinkle on the gas barrier film 6A and the gas barrier film 6B on the back-up roller 162. The temperature of the back-up roller 162 is preferably set, for example, in the range from 10 to 95° C., more preferably from 15 to 85° C. The temperature of the roller here refers to the surface temperature of the roller.

The distance between the lamination position P and the light irradiation apparatus 164 can be, for example, 30 mm or more.

The coating film is sandwiched between the gas barrier film 6A and the gas barrier film 6B, and irradiated with light and cured to form the optical functional layer, thereby producing the laminate film 8 including the barrier layer on each of both surfaces. The laminate film 8 is peeled from the back-up roller 162 by a peeling roller 180. The laminate film 8 is continuously conveyed to the roll-up machine not illustrated, and rolled up in a roll shape.

The method is described in FIG. 4, where the polymerization treatment is performed by light irradiation, but, when the curable compound included in the coating liquid is to be polymerized by heating (thermosetting), the polymerization treatment can be performed by heating such as blowing of warm air.

(Wavelength Conversion Member)

The laminate film 8 of the present embodiment can include any one of a quantum dot and a quantum rod, can be thus used as a wavelength conversion member, and can be used with being incorporated in a liquid crystal display device or the like.

A laminate film including at least any of the quantum dot and the quantum rod for use as the wavelength conversion member (hereinafter, also referred to as "quantum dot or the like") has a wavelength conversion layer including the quantum dot or the like which is at least excited by incident excitation light to emit fluorescent light.

The wavelength conversion layer in the wavelength conversion member usually includes the quantum dot or the like in an organic matrix. The organic matrix is usually a polymer obtained by polymerizing a curable compound by light irradiation or the like.

The thickness of the wavelength conversion layer is preferably in the range from 1 to 500 μm, more preferably in the range from 10 to 250 μm, particularly preferably in the range from 30 to 150 μm. When the wavelength conversion layer is formed from a plurality of layers, the film thickness of one layer is preferably in the range from 1 to 300 μm, more preferably in the range from 10 to 250 μm.

(Backlight Unit)

A backlight unit according to one aspect of the present invention includes at least the laminate film of the present invention, and a light source. The laminate film is preferably included as a constituent member of a backlight unit of a liquid crystal display device.

Figure 5A:
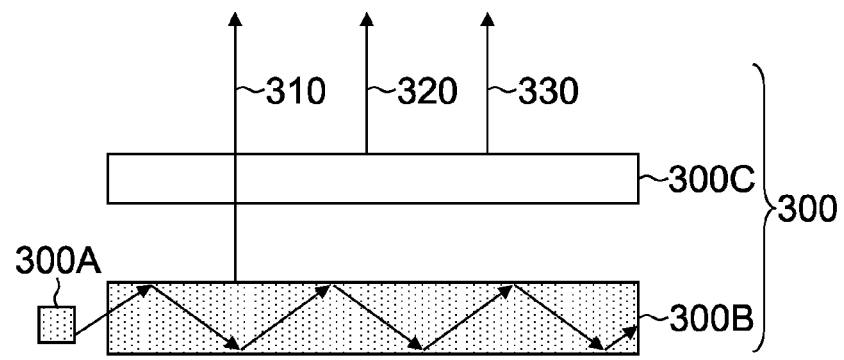
FIGS. 5A and 5B are views explaining one example of a backlight unit including the laminate film.
Figure 5B:
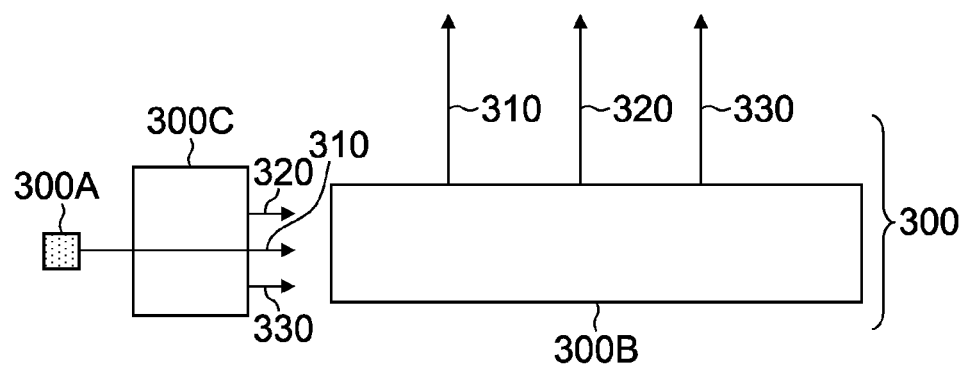

FIGS. 5A and 5B are explanation views of one example of a backlight unit 300 including the laminate film according to one aspect of the present invention. In FIGS. 5A and 5B, the backlight unit 300 includes a light source 300A, and a light guide plate 300B for providing a surface light source. In an example illustrated in FIG. 5A, a support-free laminate film 300C obtained by peeling the support 1 from the laminate film 8 produced as described above is disposed as the wavelength conversion member on the route of light emitted from the light guide plate 300B. On the other hand, in an example illustrated in FIG. 5B, the laminate film 300C as the wavelength conversion member is disposed between the light guide plate 300B and the light source 300A. Thus, the support-free laminate film 300C obtained by peeling the support 1 from the laminate film 8 can be used to thereby reduce the thickness of the backlight unit 300.

In the example illustrated in FIG. 5A, light emitted from the light guide plate 300B is incident to the laminate film 300C as the wavelength conversion member. In the example illustrated in FIG. 5A, light emitted from the light source 300A disposed on the edge portion of the light guide plate 300B is blue light 310, and is emitted toward a liquid crystal cell (not illustrated) from a surface of the light guide plate 300B, facing the liquid crystal cell. The laminate film 300C as the wavelength conversion member disposed on the route of the blue light 310 emitted from the light guide plate 300B includes at least a quantum dot (A) which is excited by the blue light 310 to emit red light 330, and a quantum dot (B) which is excited by the blue light 310 to emit green light 320. Thus, the green light 320 and the red light 330 excited and emitted, and the blue light 310 penetrating through the laminate film 300C as the wavelength conversion member are emitted from the backlight unit 300. Emission light of RGB can be thus emitted to thereby realize white light.

An example illustrated in FIG. 5B is the same as the aspect illustrated in FIG. 5A except that arrangement of the light conversion member and the light guide plate is different. In the example illustrated in FIG. 5B, the green light 320 and the red light 330 excited, and the blue light 310 penetrating through the laminate film 300C as the wavelength conversion member are emitted from the laminate film 300C as the wavelength conversion member and are incident to the light guide plate, thereby realizing a surface light source.

<Emission Wavelength of Backlight Unit>

From the viewpoint of realizing high luminance and high color reproducibility, it is preferable to use, as the backlight unit, one formed into a multi-wavelength light source. A preferable one aspect can include a backlight unit which emits blue light having a center emission wavelength in the wavelength band of 430 to 480 nm and having an emission intensity peak with a half-value width of 100 nm or less, green light having a center emission wavelength in the wavelength band of 500 to 600 nm and having an emission intensity peak with a half-value width of 100 nm or less, and red light having a center emission wavelength in the wavelength band of 600 to 680 nm and having an emission intensity peak with a half-value width of 100 nm or less.

From the viewpoint of further more enhancements in luminance and color reproducibility, the wavelength band of the blue light emitted from the backlight unit is preferably 450 to 480 nm, more preferably 460 to 470 nm.

From the same viewpoint, the wavelength band of the green light emitted from the backlight unit is preferably 520 to 550 nm, more preferably 530 to 540 nm. In addition, from the same viewpoint, the wavelength band of the red light emitted from the backlight unit is preferably 610 to 680 nm, more preferably 620 to 640 nm.

In addition, from the same viewpoint, all the half-value widths of the respective emission intensities of the blue light, the green light and the red light emitted from the backlight unit are preferably 80 nm or less, more preferably 50 nm or less, further preferably 45 nm or less, still more preferably 40 nm or less. Among them, the half-value width of emission intensity of the blue light is particularly preferably 30 nm or less.

The backlight unit includes at least a light source together with the above wavelength conversion member. In one aspect, for the light source, a light source which emits blue light having a center emission wavelength in the wavelength band of 430 nm to 480 nm, for example, a blue light emitting diode which emits blue light can be used. When the light source which emits blue light is used, it is preferable that a quantum dot-containing laminate body include at least a quantum dot (A) which is excited by excitation light to emit red light, and a quantum dot (B) which is excited by excitation light to emit green light. Thus, the blue light which is emitted from the light source to penetrate through the quantum dot-containing laminate body, and the red light and the green light which are emitted from the wavelength conversion member can realize white light.

Alternatively, in other aspect, for the light source, a light source which emits ultraviolet light having a center emission wavelength in the wavelength band of 300 nm to 430 nm, for example, an ultraviolet light emitting diode can be used. In this case, it is preferable that the wavelength conversion layer includes, together with the quantum dots (A) and (B), a quantum dot (C) which is excited by excitation light to emit blue light. Thus, the red light, the green light and the blue light emitted from the quantum dot-containing laminate body can realize white light.

In another aspect, two light sources selected from the group consisting of a blue laser which emits blue light, a green laser which emits green light and a red laser which emits red light can be used to allow a quantum dot which emits fluorescent light having a different emission wavelength from those of light emitted from the light sources to be present in the quantum dot-containing laminate body, thereby allowing the two kinds of light emitted from the light sources, and light emitted from the quantum dot of the quantum dot-containing laminate body to realize white light.

<Scattering Particle>

The wavelength conversion member can have a light-scattering function in order to efficiently extract fluorescent light of the quantum dot to the outside. The light-scattering function may be provided in the wavelength conversion layer, or a layer having the light-scattering function may be separately provided as a light-scattering layer.

As one aspect, it is also preferable that a scattering particle be added into the wavelength conversion layer.

As another aspect, it is also preferable that a light-scattering layer be provided on the surface of the wavelength conversion layer. Scattering in the light-scattering layer may depend on the scattering particle, or depend on the surface irregularity.

<Configuration of Backlight Unit>

The configuration of the backlight unit can be an edge light system in which a light guide plate, a reflection plate and the like are used as constituent members. An example of the backlight unit of the edge light system is illustrated in FIG. 5, but the backlight unit according to one aspect of the present invention may be in a direct type system. For the light guide plate, a known one can be used without any limitation.

The backlight unit can also include a reflection member (not illustrated) at the rear section of the light source 300A. Such a reflection member is not particularly limited, and a known one can be used and is described in Japanese Patent No. 3416302, Japanese Patent No. 3363565, Japanese Patent No. 4091978, Japanese Patent No. 3448626 and the like, the contents of which are herein incorporated.

It is also preferable that the backlight unit have a blue wavelength selection filter that selectively transmits light having a wavelength shorter than 460 nm, of blue light.

It is also preferable that the backlight unit have a red wavelength selection filter that selectively transmits light having a wavelength longer than 630 nm, of red light.

Such blue wavelength selection filter and red wavelength selection filter are not particularly limited, and those known can be used. Such filters are described in, for example, Japanese Patent Application Laid-Open No. 2008-052067, the content of which is herein incorporated.

It is also preferable that the backlight unit include, in addition thereto, a diffuser panel, a diffusion sheet, a prism sheet (such as BEF series produced by 3M) and a light guide which are known. Other members are also described in Japanese Patent No. 3416302, Japanese Patent No. 3363565, Japanese Patent No. 4091978, Japanese Patent No. 3448626 and the like, the contents of which are herein incorporated.

(Liquid Crystal Display Device)

A liquid crystal display device according to one aspect of the present invention includes at least the backlight unit of the present invention, and a liquid crystal cell.

<Configuration of Liquid Crystal Display Device>

The driving mode of the liquid crystal cell is not particularly limited, and various modes such as twisted nematic (TN), super twisted nematic (STN), vertical alignment (VA), in-plane switching (IPS) and optically compensated bend cell (OCB) can be utilized. The liquid crystal cell is preferably a VA mode, an OCB mode, an IPS mode or a TN mode, but is not limited thereto. Examples of the configuration of the liquid crystal display device of the VA mode include the configuration illustrated in FIG. 2 in Japanese Patent Application Laid-Open No. 2008-262161. A specific configuration of the liquid crystal display device, however, is not particularly limited, and a known configuration can be adopted.

A liquid crystal display device of one embodiment is configured to have a liquid crystal cell in which a liquid crystal layer is sandwiched between opposite substrates provided with an electrode on at least one of the substrates, this liquid crystal cell being disposed between two polarization plates. The liquid crystal display device includes a liquid crystal cell in which a liquid crystal is enclosed between the upper and lower substrates, and allows the orientation state of the liquid crystal to be changed by voltage application, to perform display of an image. The liquid crystal display device further includes a polarization plate protection film or an optical compensation member for performing optical compensation, and a functional layer associated with a bonding layer or the like, if necessary. In addition, a surface layer such as a forward scattering layer, a primer layer, a charge-suppressing layer and an undercoat layer may also be disposed together with (or instead of) a color filter substrate, a thin layer transistor substrate, a lens film, a diffusion sheet, a hard coat layer, a reflection suppressing layer, a low reflection layer, an antiglare layer and the like.

Figure 6:
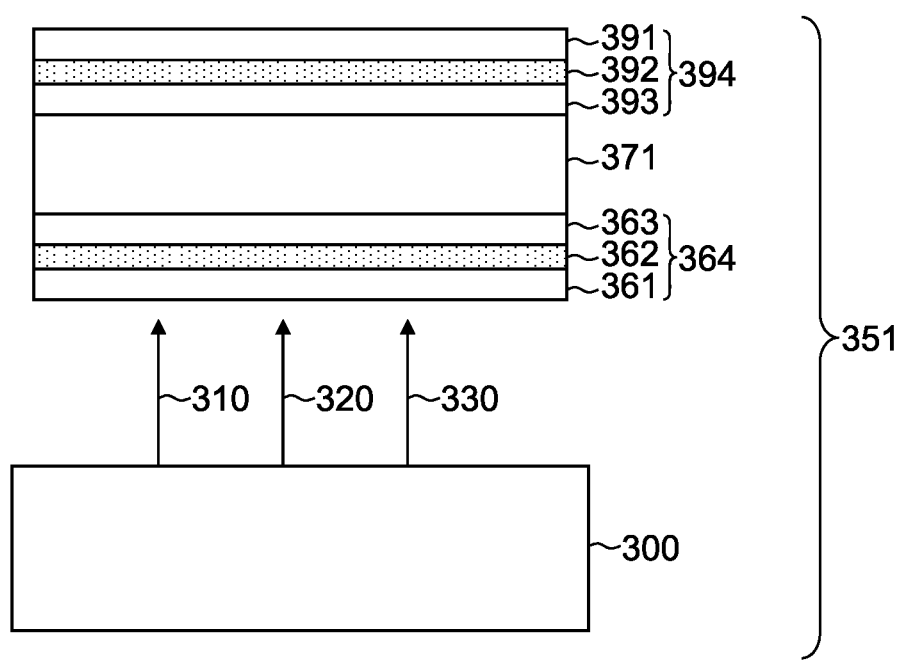
FIG. 6 is a view explaining one example of a liquid crystal display device.

FIG. 6 illustrates one example of a liquid crystal display device according to one aspect of the present invention. A liquid crystal display device 351 illustrated in FIG. 6 has a polarization plate 364 facing the backlight, on a surface facing the backlight of a liquid crystal cell 371. The polarization plate 364 facing the backlight may or may not include a polarization plate protection film 361 on a surface facing the backlight of a polarizer 362 facing the backlight, but preferably includes it.

It is preferable that the polarization plate 364 facing the backlight have a configuration in which the polarizer 362 facing the backlight is sandwiched between two polarization plate protection films 361 and 363.

In the present specification, the polarization plate protection film closer to the liquid crystal cell over the polarizer is referred to as the polarization plate protection film on the inner side, and the polarization plate protection film farther from the liquid crystal cell over the polarizer is referred to as the polarization plate protection film on the outer side. In the example illustrated in FIG. 6, the polarization plate protection film 363 corresponds to the polarization plate protection film on the inner side, and the polarization plate protection film 361 corresponds to the polarization plate protection film on the outer side.

The polarization plate facing the backlight may have a phase difference film as the polarization plate protection film on the inner side, facing the liquid crystal cell. For such a phase difference film, a known cellulose acylate film or the like can be used.

The liquid crystal display device 351 has a polarization plate 394 facing the display, on an opposite surface to the surface facing the backlight of the liquid crystal cell 371. The polarization plate 394 facing the display has a configuration in which a polarizer 392 facing the display is sandwiched between the two polarization plate protection films 391 and 393. The polarization plate protection film 393 corresponds to the polarization plate protection film on the inner side, and the polarization plate protection film 391 corresponds to the polarization plate protection film on the outer side.

The backlight unit 300 which the liquid crystal display device 351 has is as described above, and the support-free laminate film 300C in which the support 1 is peeled from the laminate film 8 can be used to thereby reduce the thickness of the liquid crystal display device 351.

The liquid crystal cell, the polarization plate, the polarization plate protection film and the like which form the liquid crystal display device according to one aspect of the present invention are not particularly limited, and those produced by a known method and commercialized products can be used without any limitation. Of course, a known intermediate layer such as a bonding layer can also be provided between respective layers.

(Color Filter)

For the method for forming RGB pixels on a color filter substrate, various known methods can be used. For example, a desired black matrix, and a pixel pattern of R, G, B can be formed on a glass substrate by using a photomask or a photoresist, or coloring inks for R, G, B pixels can be used and ink compositions can be discharged to a black matrix with a predetermined width and a region partitioned by a black matrix at a broader width than that of the black matrix at n matrix interval (a concave portion surrounded by a convex portion) by using an inkjet type printing apparatus until a desired density is achieved, to produce a color filter of a pattern of R, G, B. After an image is colored, baking or the like may also be performed to completely cure each pixel and black matrix.

Preferable properties of the color filter are described in Japanese Patent Application Laid-Open No. 2008-083611 and the like, the contents of which are herein incorporated.

As the pigment for the color filter, a known pigment can be used without any limitation. While the pigment is currently generally used, a color filter made by a dye may be adopted as long as the dye is a coloring agent which can control spectroscopy and can ensure process stability and reliability.

(Black Matrix)

It is preferable that a black matrix be arranged among respective pixels in the liquid crystal display device. A material which forms a black stripe includes one in which a film by sputtering of a metal such as chromium is used, and a light shieldable photosensitive composition as a combination of a photosensitive resin with a black colorant or the like. Specific examples of the black colorant include carbon black, titanium carbon, iron oxide, titanium oxide and graphite, and among them, carbon black is preferable.

(Thin Layer Transistor)

The liquid crystal display device can also have a TFT substrate having a thin layer transistor (hereinafter, also referred to as TFT). It is preferable that the thin layer transistor have an oxide semiconductor layer in which the carrier concentration is less than $1 \times 10^{14}/cm^3$. A preferable aspect of the thin layer transistor is described in Japanese Patent Application Laid-Open No. 2011-141522, the content of which is herein incorporated.

The liquid crystal display device according to one aspect of the present invention described above includes the backlight unit including the quantum dot-containing laminate body which can exhibit high light transmittance, and thus can realize high luminance and high color reproducibility.

EXAMPLES

Hereinafter, the present invention is described in more detail with reference to Examples. The present invention, however, is not limited to such Examples, and materials, amounts to be used, proportions, treatment contents, treatment procedures and the like shown in Examples below can be appropriately changed without departing from the gist of the present invention.

Example 1

(Production of Laminate Film)
<Support>
A polyethylene terephthalate film (PET film, produced by Toyobo Co., Ltd., trade name: Cosmoshine A4300, thickness: 50 μm, width: 1000 mm, length: 100 m) whose only one surface was undercoated with an easily bonding layer was used.

<Formation of Organic Layer>

Formation of an organic layer on the support was performed. First, preparation of a coating liquid for organic layer formation was performed. The coating liquid for organic layer formation was prepared as follows: TMPTA (trimethylolpropane triacrylate, produced by Daicel-Cytec Co., Ltd. (DAICEL-ALLNEX LTD. at present)) and a photopolymerization initiator (produced by Lamberti SpA, ESACUREKTO 46) were provided, weighed so that the weight ratio of TMPTA:photopolymerization initiator was 95:5, and dissolved in methyl ethyl ketone to provide the coating liquid having a solid content concentration of 15%.

A smooth surface opposite to an easily bonding surface of the PET film as the support was coated with the coating liquid for organic layer formation by a roll-to-roll system using a die coater. The PET film after coating was allowed to pass through a drying zone at 50° C. for 3 minutes, and thereafter was irradiated with ultraviolet light (cumulative amount of radiation: about 600 mJ/cm$^2$) and cured by UV curing. A polyethylene film (PE film, produced by Sun A. Kaken Co., Ltd., trade name: PAC2-30-T) as a protection film was attached at a pass roll immediately after the UV curing, and conveyed and rolled up. The thickness of the organic layer formed on the support was 1 μm.

<Formation of Inorganic Layer>

Next, a roll-to-roll type CVD apparatus was used to form an inorganic layer (silicon nitride (SiN) layer) on the surface of the organic layer. The support was fed from a feeding machine and passed through a final film surface touch roll before film formation of the inorganic layer, and thereafter the protection film was peeled to form the inorganic layer on the organic layer exposed. For formation of the inorganic layer, a silane gas (flow rate: 160 sccm), an ammonia gas (flow rate: 370 sccm), a hydrogen gas (flow rate: 590 sccm) and a nitrogen gas (flow rate: 240 sccm) were used as raw material gases. A high-frequency power source with a frequency of 13.56 MHz was used as a power source to form the SiN layer. The film formation pressure was 40 Pa, and the arrival film thickness was 50 nm.

The inorganic layer was thus formed on the organic layer, a protective PE film was attached at a film surface touch roll portion after the formation, and an inorganic film was conveyed without being in contact with the pass roll, and thereafter rolled up.

<Formation of Optical Functional Layer>

The protective PE film of the gas barrier film configured by the support and the barrier layer including the organic film and the inorganic film, formed as described above, was peeled, and the inorganic layer was coated with a coating liquid for optical functional layer formation to form a coating film. The coating liquid for optical functional layer formation was prepared so as to have the following composition. The coating film of the optical functional layer was sandwiched between gas barrier films formed by the same method as the above, and subjected to UV curing to form a laminate film in a roll-to-roll manner.

(Composition of Coating Liquid for Optical Functional Layer Formation)

As the coating liquid for optical functional layer formation, a quantum dot dispersion liquid having the following composition was prepared.

| | |
|---|---|
| Dispersion liquid of quantum dot 1 in toluene (emission local maximum: 520 nm) | 10 parts by mass |
| Dispersion liquid of quantum dot 2 in toluene (emission local maximum: 630 nm) | 1 part by mass |
| Lauryl methacrylate | 2.4 parts by mass |
| Trimethylolpropane triacrylate | 0.54 parts by mass |
| Photopolymerization initiator (Irgacure 819 (produced by Chiba Speciality Chemicals Co., Ltd.)) | 0.009 parts by mass |

For quantum dots 1 and 2, the following nano crystals having the following core-shell structure (InP/ZnS) were used.

Quantum dot 1: INP 530-10 (produced by NN-Labs, LLC)

Quantum dot 2: INP 620-10 (produced by NN-Labs, LLC)

The viscosity of the coating liquid for optical functional layer formation was 50 mPa·s.

<Sheet Processing>

The laminate film formed was punched using a Thompson blade having a blade tip angle of 17° to form an A4 size sheet shape.

<Measurement of Adhesion Force>

With respect to the A4 size laminate film produced as described above, the adhesion force between the support and the barrier layer of the gas barrier film (namely, the adhesion force between the support and the organic layer), and the adhesion force between the barrier layer and the optical functional layer (namely, the adhesion force between the inorganic layer and the optical functional layer) were measured as follows.

With respect to a test piece of 1 inch in width cut out from the laminate film using ASTM standard D1876, the peeling force required for peeling the support from the test piece was measured using a tensile tester.

As a result, the adhesion force between the support and the organic layer was 0.5 N (Newton), and when the support was peeled from the laminate film, it was clearly peeled at the interface between the support and the barrier layer without causing the barrier layer and the optical functional layer to be broken.

In addition, the adhesion force between the inorganic layer and the optical functional layer was 1.6 N (Newton), and the following adhesion force conditions in the present invention were satisfied: "the adhesion force between the support and the barrier layer being smaller than the adhesion force between the optical functional layer and the barrier layer, and the adhesion force between the support and the barrier layer being an adhesion force enabling peeling".

Here, forced peeling between the inorganic layer and the optical functional layer caused the interface between the inorganic layer and the optical functional layer to be broken.

Thus, the laminate film produced in the present Example enables to inhibit the optical functional layer from being degraded due to ingress of oxygen and/or steam to the optical functional layer and to reduce the thickness of the backlight unit in use inside the backlight unit. Accordingly, the laminate film is suitable for, in particular, a liquid crystal display device for a mobile application.

Example 2

Next, in formation of the laminate film in Example 1, the magnitude of the adhesion force between the support and the organic layer, and the magnitude of the adhesion force between the inorganic layer and the optical functional layer were changed according to Tests 1 to Tests 10 as in Table of FIG. 7, and preferable adhesion force conditions were investigated with respect to the following two items.

(i) Preferable range of adhesion force enabling peeling, between support and barrier layer.

(ii) Preferably how small adhesion force between support and barrier layer being compared with adhesion force between optical functional layer and barrier layer.

The above two items were evaluated by examining "peeling on pass roller", "breaking of organic layer" and "peeling of inorganic layer/optical functional layer".

The "peeling on pass roller" means whether or not the support was peeled from the organic layer in conveyance of the laminate film by a pass roller type conveyance apparatus. A case where no peeling was observed was rated as "A", a case where slight peeling was observed, but not problematic was rated as "B" and a case where clear peeling was observed was rated as "C".

The "breaking of organic layer" means whether or not breaking of the organic layer occurred in peeling of the support. A case where no breaking was observed was rated as "A", a case where slight breaking was observed, but not problematic was rated as "B" and a case where clear breaking was observed and was problematic was rated as "C".

The "peeling of inorganic layer/optical functional layer" means whether or not peeling of the optical functional layer and the barrier layer, not intended to be peeled, occurred in peeling of the support from the laminate film. A case where no peeling was observed was rated as "A", a case where slight peeling was observed, but not problematic was rated as "B" and a case where clear peeling was observed was rated as "C".

<Test Results>
(i) Preferable range of adhesion force enabling peeling, between support and barrier layer As in Test 1 in Table of FIG. 7, when the adhesion force between the support and the organic layer was as too small as 0.1 N, the "peeling on pass roller" was rated as "C", and the following problem could be caused: the support was peeled in a condition other than peeling intended of the support from the laminate film.

As in Test 4, when the adhesion force between the support and the organic layer was as too large as 1.5 N, the "peeling on pass roller" was rated as "A", but the "breaking of organic layer" was rated as "C". That is, the following problem could be caused: the adhesion force was so large as to break the organic layer in peeling of the support from the laminate film.

On the contrary, as in Tests 2 to 3 and Tests 5 to 10, when the adhesion force between the support and the organic layer was in the range from 0.2 N to 1.0 N, the "peeling on pass roller" and the "breaking of organic layer" were rated as "A" or "B", and were good results.

It can be seen from the results that a preferable range of the adhesion force enabling peeling, between the support and the barrier layer, is the range from 0.2 N to 1.0 N.

(ii) Preferably how small adhesion force between support and barrier layer being compared with adhesion force between optical functional layer and barrier layer As in Tests 5 and 8 in Table of FIG. 7, when the adhesion force between the support and the barrier layer was smaller than the adhesion force between the optical functional layer and the barrier layer by only 0.2 N, the "peeling of inorganic layer/optical functional layer" was rated as "C". That is, peeling of the optical functional layer and the barrier layer not intended to be peeled could occur in peeling of the support from the laminate film.

On the contrary, as in Tests 1 to 4, Tests 6 to 7 and Tests 9 to 10, when the adhesion force between the support and the barrier layer was smaller than the adhesion force between the optical functional layer and the barrier layer by 0.4 N or more, the "peeling of inorganic layer/optical functional layer" was rated as "A" or "B", and were good results.

It can be seen from the results that the adhesion force between the support and the barrier layer is preferably smaller than the adhesion force between the optical functional layer and the barrier layer by 0.4 N or more.

Accordingly, it is preferable in the present invention that the adhesion force conditions: "the adhesion force between the support and the barrier layer being smaller than the adhesion force between the optical functional layer and the barrier layer by 0.4 N or more, and the adhesion force between the support and the barrier layer being in the range from 0.2 N to 1.0 N"; be satisfied.

What is claimed is:

1. A laminate film comprising a gas barrier film having a barrier layer and a support which supports the barrier layer stacked on one surface of both surfaces of an optical functional layer,
   wherein the gas barrier film and the optical functional layer satisfy following adhesion force conditions: an adhesion force between the support and the barrier layer is smaller than an adhesion force between the optical functional layer and the barrier layer, and the adhesion force between the support and the barrier layer is an adhesion force enabling peeling, and
   wherein the gas barrier film is also stacked on the other surface of the optical functional layer, and the gas barrier film on the other surface and the optical functional layer satisfy such a different adhesion force condition from the adhesion force conditions for the gas barrier film on the one surface that an adhesion force between the support and the barrier layer is an adhesion force not enabling peeling.

2. The laminate film according to claim 1, wherein the adhesion force enabling peeling is 7.87 N/m or more and 39.37 N/m or less.

3. The laminate film according to claim 1, wherein the optical functional layer contains at least one of a quantum dot or a quantum rod.

4. The laminate film according to claim 1, wherein the barrier layer comprises an inorganic layer and an organic layer, and the organic layer is disposed facing the support and the inorganic layer is disposed facing the optical functional layer.

5. The laminate film according to claim 4, wherein the adhesion force conditions are achieved by at least one of a selection of a material of the support, a treatment for a reduction in an adhesion force to the support, and an adjustment of composition of the barrier layer.

* * * * *